United States Patent
Chitlur Srinivasa

(10) Patent No.: US 7,782,869 B1
(45) Date of Patent: Aug. 24, 2010

(54) NETWORK TRAFFIC CONTROL FOR VIRTUAL DEVICE INTERFACES

(75) Inventor: Venkatesh Babu Chitlur Srinivasa, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 274 days.

(21) Appl. No.: 11/947,039

(22) Filed: Nov. 29, 2007

(51) Int. Cl.
H04L 12/28 (2006.01)

(52) U.S. Cl. .................. 370/395.41; 370/230; 370/400; 370/401

(58) Field of Classification Search .................. 370/230, 370/395.4, 400, 412, 428, 468, 401, 419, 370/230.1, 231, 232, 235, 235.1, 252, 254, 370/351, 395.41, 408; 709/203, 238, 220, 709/227, 223; 711/1; 712/30
See application file for complete search history.

(56) References Cited

U.S. PATENT DOCUMENTS

| | | | |
|---|---|---|---|
| 6,760,306 B1 | 7/2004 | Pan | |
| 6,829,649 B1 | 12/2004 | Shorey | |
| 7,126,913 B1 | 10/2006 | Patel | |
| 7,143,024 B1* | 11/2006 | Goyal et al. | 703/21 |
| 7,219,354 B1* | 5/2007 | Huang et al. | 719/328 |
| 7,385,987 B1* | 6/2008 | Charny et al. | 370/395.4 |
| 2002/0138628 A1* | 9/2002 | Tingley et al. | 709/227 |
| 2003/0037127 A1* | 2/2003 | Shah et al. | 709/220 |
| 2005/0044301 A1* | 2/2005 | Vasilevsky et al. | 711/1 |
| 2005/0060427 A1* | 3/2005 | Phillips et al. | 709/238 |
| 2005/0068798 A1 | 3/2005 | Lee | |
| 2005/0120102 A1 | 6/2005 | Gandhi et al. | |
| 2005/0120160 A1* | 6/2005 | Plouffe et al. | 711/1 |
| 2005/0289246 A1* | 12/2005 | Easton et al. | 710/1 |
| 2006/0028987 A1 | 2/2006 | Gilfind | |
| 2006/0165103 A1* | 7/2006 | Trudeau et al. | 370/401 |
| 2006/0193256 A1* | 8/2006 | Burns et al. | 370/230 |
| 2007/0070908 A1 | 3/2007 | Ghosh | |
| 2007/0226332 A1* | 9/2007 | Becker-Szendy et al. | 709/224 |
| 2007/0268914 A1* | 11/2007 | Fisher et al. | 370/400 |
| 2007/0297414 A1* | 12/2007 | Gupta et al. | 370/395.4 |
| 2008/0008090 A1* | 1/2008 | Gilfix | 370/230 |
| 2008/0123676 A1* | 5/2008 | Cummings et al. | 370/419 |

(Continued)

OTHER PUBLICATIONS

Cisco Systems, Inc., "Cisco 10000 Series Router Quality of Service Configuration, Policing Traffic" @ 1992-2007 Cisco Systems, Inc., downloaded Dec. 3, 2007, pp. 6-1-6-34.

(Continued)

Primary Examiner—Aung S Moe
Assistant Examiner—Abdullah Riyami

(57) ABSTRACT

Processes for the control of traffic and Quality of Service (QoS) over a switch fabric network comprised of application servers and virtual I/O servers. In the embodiment, an application server includes virtual device interfaces, a QoS module, and a network port controlled by a packet scheduler. When the QoS module receives a packet from a virtual device interface, the QoS module stores the packet in a queue. The QoS module removes the packet from the queue and transmits it to the packet scheduler, in accordance with a hierarchical token bucket that allocates bandwidth for the port among the virtual device interfaces in the application server. In the embodiment, the port is the root of the hierarchy for the hierarchical token bucket and the virtual device interfaces are the leaves. The packet scheduler uses round-round arbitration to transmit the packet it receives to the port.

17 Claims, 20 Drawing Sheets

U.S. PATENT DOCUMENTS

| | | | |
|---|---|---|---|
| 2008/0159135 A1* | 7/2008 | Caram | 370/230 |
| 2008/0244075 A1* | 10/2008 | Kuo et al. | 709/227 |
| 2009/0003204 A1* | 1/2009 | Okholm et al. | 370/230 |
| 2009/0083517 A1* | 3/2009 | Riddle | 712/30 |

OTHER PUBLICATIONS

Barham, P., et. al., "Xen and the Art of Virtualization," University of Cambridge Computer Laboratory, @ 2003, SOSP '03, Oct. 19-22, 2003, Bolton Landing, New York.

Delchev, I., "Linux Traffic Control," Networks and Distributed Systems Seminar, International University Bremen, Spring 2006.

Pentaklos, O., "An Introduction to the InfiniBand Architecture," Published on O'Reilly Network (http://www.oreillynet.com), Feb. 4, 2002, downloaded Mar. 16, 2007.

Valenzuela, J.L., et. al., "A Hierarchical Token Bucket Algorithm to Enhance QoS in IEEE 802.11: Proposal, Implementation and Evaluation," Digital Object Identifier 10.1109/VETECF.2004.1400539, IEEE, vol. 4, Sep. 2004.

Matharu, H., "Evaluating high speed industry standard serial interconnects," Embedded Computing Design, Jul. 2005, IDT Inc., Santa Clara, California.

Reinemo, S., et. al., "An Overview of QoS Capabilities in InfiniBand, Advanced Switching Interconnect, and Ethernet," IEEE Communications Magazine, Jul. 2006, pp. 32-38, Sun Microsystems.

Kozyrakis, Christos, "Lecture 11: Architectural Support for Virtual Machines," Dept of Electrical Engineering, Stanford University (http://eeclass.stanford.edu/ee282), EE282—Fall 2005.

Astuti, D., "Packet Handling," Seminar on Trasnport of Multimedia Streams in Wireless Internet, downloaded Dec. 3, 2007.

Hussain, M., et. al., "Using OpenFabrics InfiniBand for HPC Clusters," Dell Power Solutions, Nov. 2006, pp. 59-61, Dell, Inc.

Heinanen, J., et. al., "A Single Rate Three Color Marker," @ The Internet Society 1999., pp. 1-6.

Fraser, K., et. al., "Reconstructing I/O," Technical Report, No. 596, Universtiy of Cambridge Computer Laboratory, Aug. 2004.

Warfield, A., et. al., "Facilitating the Develoment of Soft Devices," University of Cambridge Computer Laboratory, downloaded Mar. 16, 2007.

Wu, J., et. al., "Hierarchical Disk Sharing for Multimedia Systems," NOSSDAV '05, Jun. 13-14, 2005, Stevenson, Washington, @ 2005.

Sundarrajan, S., et. al., "Xen and Server Consolidation," Infosys, White Paper, Infosys Technologies Ltd., Jun. 2006.

Goldengerg, D., "InfiniBand Device Virtualization in Xen," Mellanox Technologies Ltd., Jan. 19, 2006.

Liu, J., et. al., "High Performance VMM-Bypass I/O in Virtual Machines," Technical Report OSU-CISRC-2/06-TR22, Feb. 2006.

Huang, W., et. al., "InfiniBand Support in Xen Virtual Machine Environment," Technical Report OSU-CISRC-10/05-TR63, Oct. 2005.

Liu, J., et. al., "Evaluating the Impact of RDMA on Storage I/O over InfiniBand*," Computer & Information Science,The Ohio State University, downloaded on Apr. 13, 2007.

Balaji, P. et. al., "On the Provision of Prioritization and Soft QoS in Dynamically Reconfigurable Shared Data-Centers over InfiniBand," Computer Science and Engineering, The Ohio State University, downloaded Apr. 12, 2007.

Sumimoto, S. et. al., "The RIKEN Super Combined Cluster and SCoreCluster System Software—Achieves 8.72 TFLOPS on Cluster of Clusters—", High Performance Computing and Grid in Asia Pacific Region Conference,@ Fujitsu Laboratories, Ltd, 2004.

Sumimoto, S. et. al., "PM/InfiniBand-FJ: A Design of High Performance Communication Facility Using InfiniBand for Large Scale PC Clusters," High Performance Computing and Grid in Asia Pacific Region Conference,@ Fujitsu Laboratories Tld., 2004.

Shipman, G., et. al., "Infiniband Scalability in Open MPI," Los Alamos National Laboratory, downloaded Apr. 12, 2007.

"Linus System Software for the InfiniBand* Architecture," Software Architecture Specification (SAS), Revision 1.0.1 Last Print Date Aug. 1, 2002.

Liu, J., et. al., "Building Multirail InfiniBand Clusters: MPI-Level Design and Performance Evaluation," Technical Report OSU-CISRC-5/04-TR26, May 2004.

Liu, J., et. al., "MPI over InfiniBand: Early Experiences," Technical Report OSU-CIRSC-10/02-TR25, Oct. 2002.

OFED (OpenFabrics Enterprise Distribution), "High performance server and storage connectivity software for field-proven RDMA and Transport Offload hardware solutions," Mellanox Technologies, Linux Edition, Rev. 1.0 @ 2006.

Velusamy, V., et. al., "Programming the InfiniBand Network Architecture for High Performance Message Passing Systems," Mississippi State University, downloaded Apr. 12, 2007.

"Intel Architecture Based InfiniBand* Cluster," TeraFlops Off-The-Shelf (TOTS); downloaded Apr. 13, 2007.

Mellanox Technologies, Inc., "I/O Virtualization Using Mellanox InfiniBand and Channel I/O Virtualization (CIOV) Technology," @ 2007.

U.S. Appl. No. 11/925,615 entitled "Quality of Service in Virtual Computing Environments", filed Dec. 7, 2007.

Office Action for U.S. Appl. No. 11/925,615, Aug. 6, 2009.

* cited by examiner

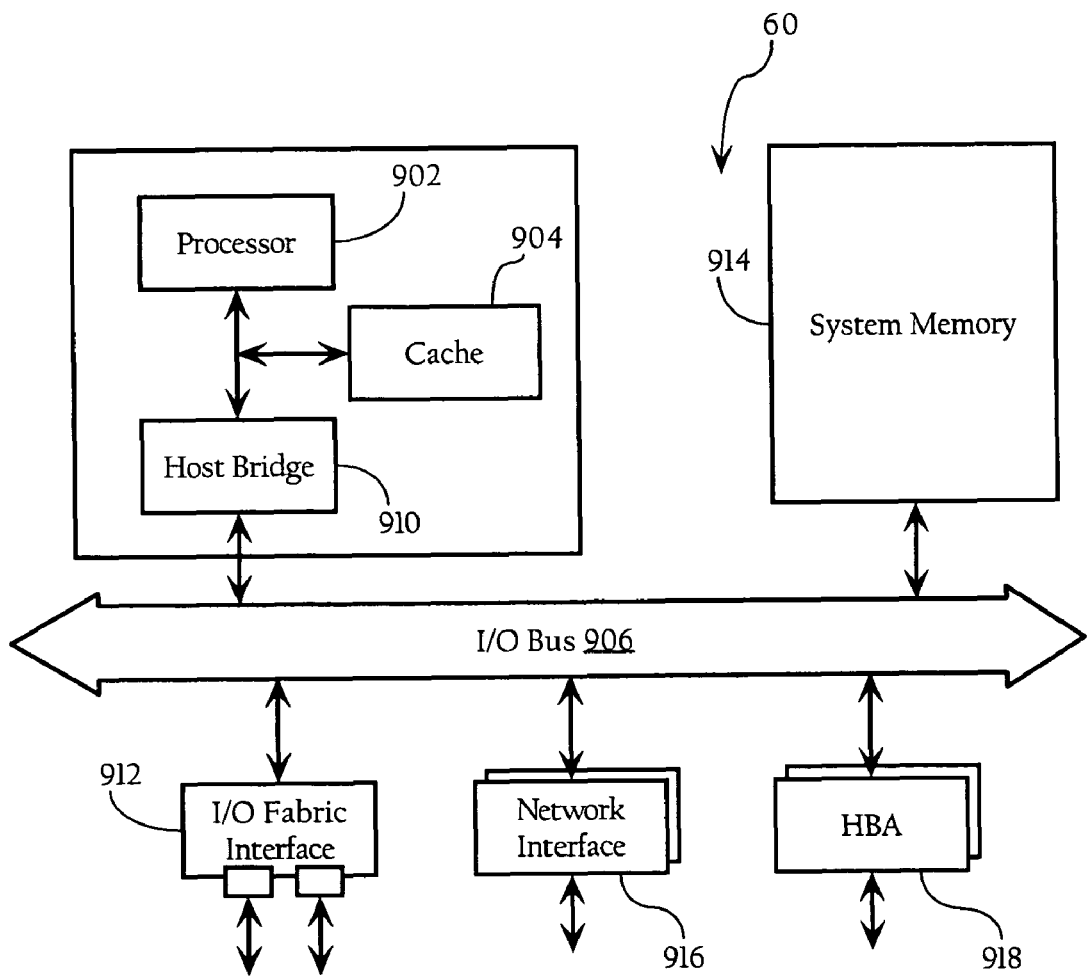
Fig._2

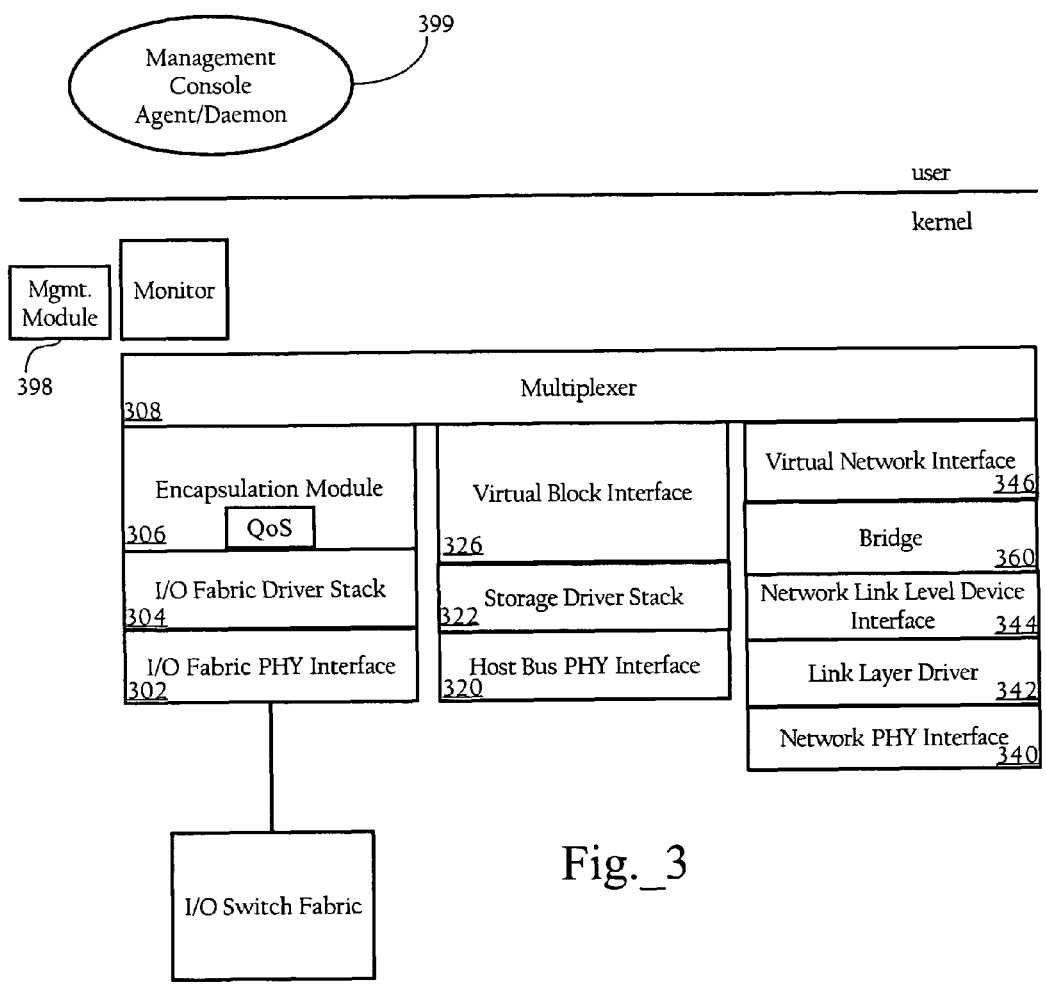
Fig._3

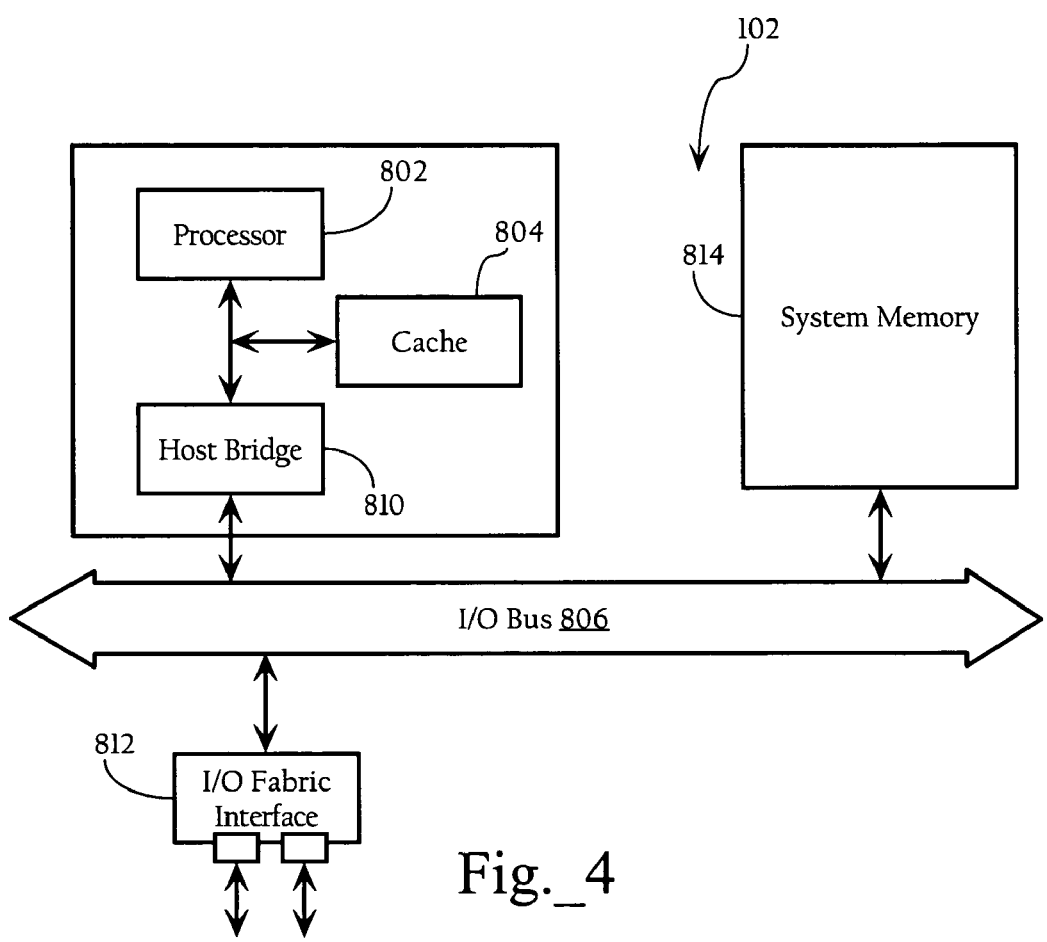
Fig._4

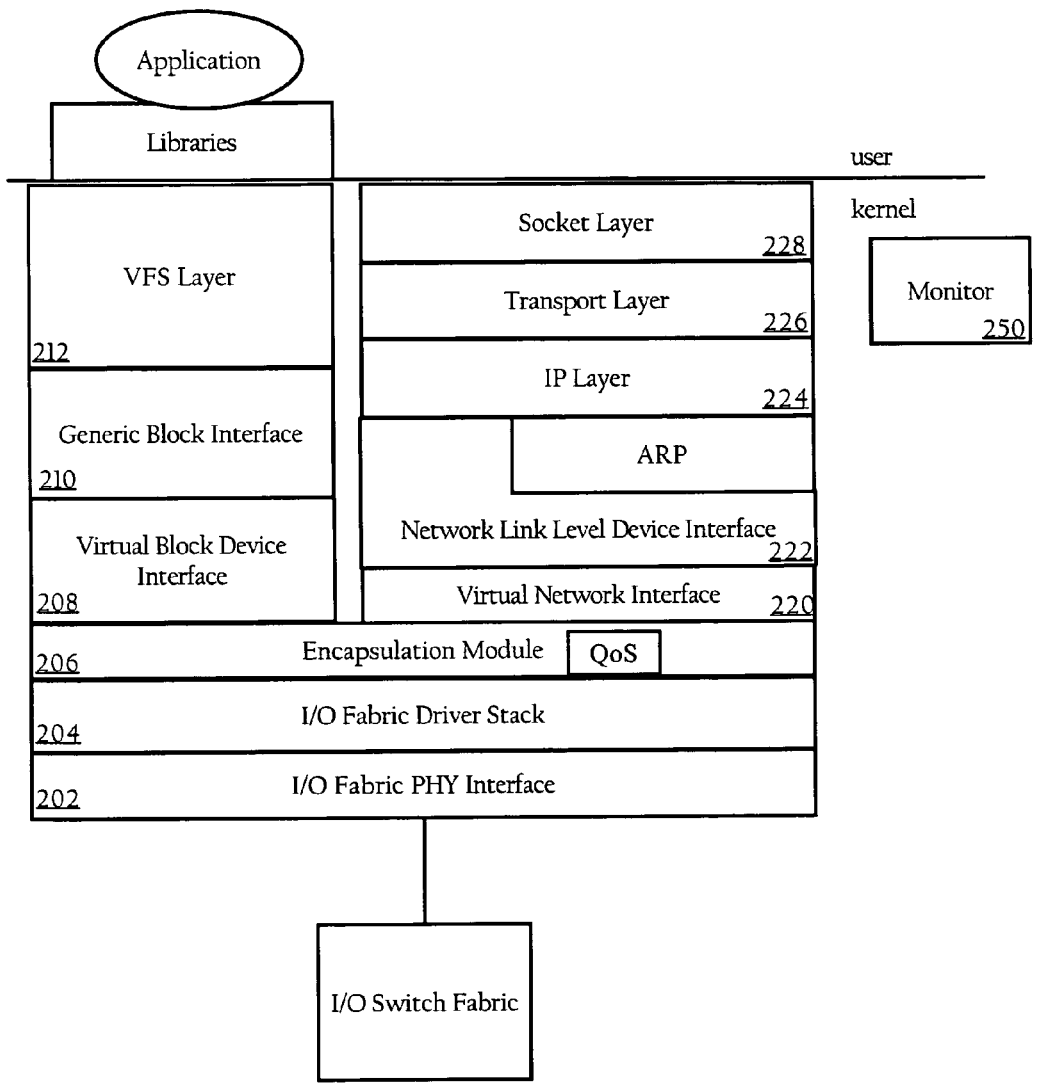
Fig._5

Topology A

Topology B

Topology C

Topology D

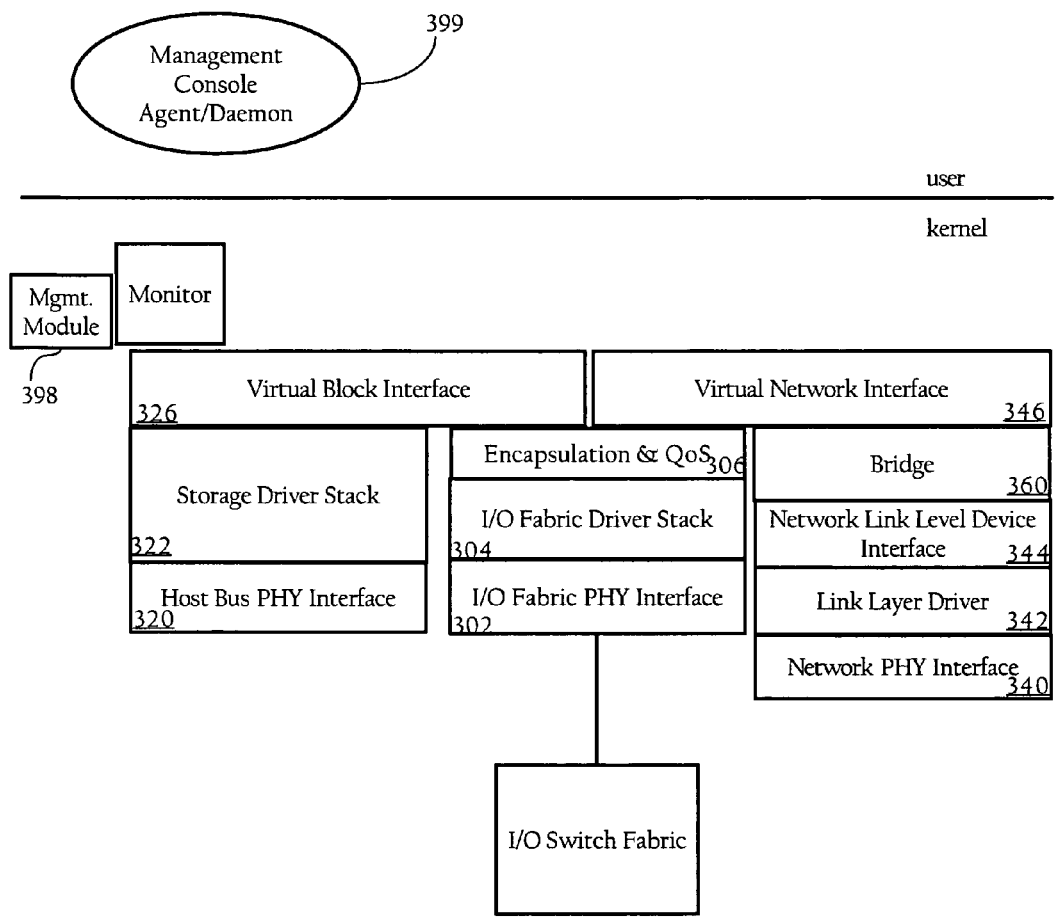
Fig._8A

Hierarchical Token Bucket Design

| CN1 | | | CN2 | | |
|---|---|---|---|---|---|
| Minimum | 10% | | Minimum | 20% | |
| Maximum | 50% | | Maximum | 50% | |
| | Storage | Network | | Storage | Network |
| Minimum | 40% | 40% | Minimum | 30% | 70% |
| Maximum | 50% | 50% | Maximum | 50% | 80% |

| | |
|---|---|
| Current rate < Minimum | Send pkts |
| Minimum < Current rate < Maximum | Borrow tokens and Send pkts |
| Current rate > Maximum | Drop or delay pkts |

| | |
|---|---|
| MTU | 5 |
| Quantum | 10 |
| Token Allocation | 1000 units / T100 |

| Level | Burst Size |
|---|---|
| 0 | 200 |
| 1 | 500 |
| 2 | 1500 |

Fig. 13A

| Time | Packet Destina | Packet Size | Tokens consum | Node Type | Level | \multicolumn{4}{c|}{Available Tokens} | Allotted tokens |
|------|---------|------|------|---------|---|-----|-----|------|-----|------|
|      |         |      |      |         |   | VNI | VBI | VNI  | VBI |      |
| T-2  |         |      |      | VNI/VBI | 0 | 40% | 40% | 30%  | 70% |      |
|      |         |      |      | CN1/CN2 | 1 |     | 10% |      | 20% | 1000 |
|      |         |      |      | Port    | 2 |     |     |      |     |      |
| T-1  |         |      |      | VNI/VBI | 0 | 40% | 40% | 30%  | 70% |      |
|      |         |      |      | CN1/CN2 | 1 |     | 100 | 1000 | 200 |      |
|      |         |      |      | Port    | 2 |     |     |      |     |      |
| T0   |         |      |      | VNI/VBI | 0 | 40  | 40  | 60   | 140 |      |
|      |         |      |      | CN1/CN2 | 1 |     | 20  | 700  | 0   |      |
|      |         |      |      | Port    | 2 |     |     |      |     |      |
| T1   | CN2:VNI | 5    |      | VNI/VBI | 0 | 40  | 40  | 55   | 140 |      |
|      |         |      |      | CN1/CN2 | 1 |     | 20  | 700  | 0   |      |
|      |         |      | 5    | Port    | 2 |     |     |      |     |      |
| T2   | CN2:VNI | 5    |      | VNI/VBI | 0 | 40  | 40  | 50   | 140 |      |
|      |         |      |      | CN1/CN2 | 1 |     | 20  | 700  | 0   |      |
|      |         |      | 5    | Port    | 2 |     |     |      |     |      |
| T3   | CN2:VNI | 5    |      | VNI/VBI | 0 | 40  | 40  | 45   | 140 |      |
|      |         |      |      | CN1/CN2 | 1 |     | 20  | 700  | 0   |      |
|      |         |      | 5    | Port    | 2 |     |     |      |     |      |
| T4   | CN2:VNI | 5    |      | VNI/VBI | 0 | 40  | 40  | 40   | 140 |      |
|      |         |      |      | CN1/CN2 | 1 |     | 20  | 700  | 0   |      |
|      |         |      | 5    | Port    | 2 |     |     |      |     |      |
| T5   | CN2:VNI | 5    |      | VNI/VBI | 0 | 40  | 40  | 35   | 140 |      |
|      |         |      |      | CN1/CN2 | 1 |     | 20  | 700  | 0   |      |
|      |         |      | 5    | Port    | 2 |     |     |      |     |      |
| T6   | CN2:VNI | 5    |      | VNI/VBI | 0 | 40  | 40  | 30   | 140 |      |
|      |         |      |      | CN1/CN2 | 1 |     | 20  | 700  | 0   |      |
|      |         |      | 5    | Port    | 2 |     |     |      |     |      |
| T7   | CN2:VNI | 5    |      | VNI/VBI | 0 | 40  | 40  | 25   | 140 |      |
|      |         |      |      | CN1/CN2 | 1 |     | 20  | 700  | 0   |      |
|      |         |      | 5    | Port    | 2 |     |     |      |     |      |
| T8   | CN2:VNI | 5    |      | VNI/VBI | 0 | 40  | 40  | 20   | 140 |      |
|      |         |      |      | CN1/CN2 | 1 |     | 20  | 700  | 0   |      |
|      |         |      | 5    | Port    | 2 |     |     |      |     |      |

| Time | Packet Destina | Packet Size | Tokens consum | Node Type | Level | Available Tokens ||||| Allotted tokens |
|---|---|---|---|---|---|---|---|---|---|---|---|
| | | | | | | VNI | VBI | VBI | VNI | VBI | |
| T9 | CN2:VNI | 5 | | VNI/VBI | 0 | 40 | | 40 | 15 | 140 | |
| | | | | CN1/CN2 | 1 | | 20 | | | 0 | |
| | | | 5 | Port | 2 | | | | | | |
| T10 | CN2:VNI | 5 | | VNI/VBI | 0 | 40 | | 40 | 10 | 140 | |
| | | | | CN1/CN2 | 1 | | 20 | | 700 | 0 | |
| | | | 5 | Port | 2 | | | | | | |
| T11 | CN2:VNI | 5 | | VNI/VBI | 0 | 40 | | 40 | 5 | 140 | |
| | | | | CN1/CN2 | 1 | | 20 | | 700 | 0 | |
| | | | 5 | Port | 2 | | | | | | |
| T12 | CN2:VNI | 5 | | VNI/VBI | 0 | 40 | | 40 | 0 | 140 | |
| | | | | CN1/CN2 | 1 | | 20 | | 700 | 0 | |
| | | | 5 | Port | 2 | | | | | | |
| T13 | | | | VNI/VBI | 0 | 40 | | 40 | 10 | 140 | |
| | | | | CN1/CN2 | 1 | | 20 | | 690 | 0 | |
| | | | 5 | Port | 2 | | | | | | |
| T14 | CN2:VNI | 5 | | VNI/VBI | 0 | 40 | | 40 | 5 | 140 | |
| | | | | CN1/CN2 | 1 | | 20 | | 690 | 0 | |
| | | | 5 | Port | 2 | | | | | | |
| T15 | CN2:VNI | 5 | | VNI/VBI | 0 | 40 | | 40 | 0 | 140 | |
| | | | | CN1/CN2 | 1 | | 20 | | 690 | 0 | |
| | | | 5 | Port | 2 | | | | | | |
| T16 | | | | VNI/VBI | 0 | 40 | | 40 | 10 | 140 | |
| | | | | CN1/CN2 | 1 | | 20 | | 680 | 0 | |
| | | | 5 | Port | 2 | | | | | | |
| T17 | CN2:VNI | 5 | | VNI/VBI | 0 | 40 | | 40 | 5 | 140 | |
| | | | | CN1/CN2 | 1 | | 20 | | 680 | 0 | |
| | | | 5 | Port | 2 | | | | | | |
| T18 | CN2:VNI | 5 | | VNI/VBI | 0 | 40 | | 40 | 0 | 140 | |
| | | | | CN1/CN2 | 1 | | 20 | | 680 | 0 | |
| | | | 5 | Port | 2 | | | | | | |
| T19 | | | | VNI/VBI | 0 | 40 | | 40 | 10 | 140 | |
| | | | | CN1/CN2 | 1 | | 20 | | 670 | 0 | |
| | | | 5 | Port | 2 | | | | | | |
| T20 | CN2:VNI | 5 | | VNI/VBI | 0 | 40 | | 40 | 5 | 140 | |
| | | | | CN1/CN2 | 1 | | 20 | | 670 | 0 | |
| | | | 5 | Port | 2 | | | | | | |

| Time | Packet Destina | Packet Size | Tokens consum | Node Type | Level | Available Tokens VNI | Available Tokens VBI | Available Tokens VNI | Available Tokens VBI | Allotted tokens |
|---|---|---|---|---|---|---|---|---|---|---|
| T21 | CN2:VNI | 5 | | VNI / VBI | 0 | 40 | 40 | 0 | 140 | |
| | | | | CN1 / CN2 | 1 | | 20 | | 0 | |
| | | | | Port | 2 | | | 670 | | |
| T22 | | | 5 | VNI / VBI | 0 | 40 | 40 | 10 | 140 | |
| | | | | CN1 / CN2 | 1 | | 20 | | 0 | |
| | | | | Port | 2 | | | 660 | | |
| T23 | CN2:VNI | 5 | | VNI / VBI | 0 | 40 | 40 | 5 | 140 | |
| | | | | CN1 / CN2 | 1 | | 20 | | 0 | |
| | | | | Port | 2 | | | 660 | | |
| T24 | CN2:VNI | 5 | | VNI / VBI | 0 | 40 | 40 | 0 | 140 | |
| | | | | CN1 / CN2 | 1 | | 20 | | 0 | |
| | | | | Port | 2 | | | 660 | | |
| T25 | | | 5 | VNI / VBI | 0 | 40 | 40 | 0 | 140 | |
| | | | | CN1 / CN2 | 1 | | 20 | | 0 | |
| | | | | Port | 2 | | | 660 | | |
| T26 | CN2:VNI | 5 | | VNI / VBI | 0 | 40 | 40 | 0 | 140 | |
| | | | | CN1 / CN2 | 1 | | 20 | | 0 | |
| | | | | Port | 2 | | | 660 | | |
| T27 | CN2:VNI | 5 | | VNI / VBI | 0 | 40 | 40 | 0 | 140 | |
| | | | | CN1 / CN2 | 1 | | 20 | | 0 | |
| | | | | Port | 2 | | | 660 | | |
| T100 | | | | VNI / VBI | 0 | 40 + 40 | 40 + 40 | 0 + 60 | 140 + 140 | 1000 |
| | | | | CN1 / CN3 | 1 | 20 + 20 | | 0 + 0 | | |
| | | | | Port | 2 | | 700 + 660 | | | |
| T100.1 | | | | VNI / VBI | 0 | 80 | 80 | 60 | 200 | |
| | | | | CN1 / CN2 | 1 | | 40 | | 0 | |
| | | | | Port | 2 | | | 1360 | | |
| T200 | | | | VNI / VBI | 0 | 120 | 120 | 120 | 200 | 1000 |
| | | | | CN1 / CN2 | 1 | | 60 | | 0 | |
| | | | | Port | 2 | | | 1500 | | |

Fig. 13D

NETWORK TRAFFIC CONTROL FOR VIRTUAL DEVICE INTERFACES

TECHNICAL FIELD

The present disclosure relates to quality of service (QoS) and the shaping of traffic over a switch fabric network in a distributed system that includes virtualization of input/output (I/O) subsystems.

BACKGROUND

Enterprises have grown increasingly reliant on computing systems to accomplish mission-critical tasks. Indeed, enterprises expend vast amounts of resources dedicated to deploying and supporting servers and other processing systems, as availability of sufficient computing resources is critical to enterprise performance. With increasing complexity and number of applications typically deployed in business environments today, providing sufficient computing resources to meet business needs in a cost effective manner poses many challenges.

The workload on a typical server implementation can vary dramatically throughout the day. In fact, demand for one or more applications, and therefore the processing and I/O resources requirements to effectively support these applications, can shift and vary considerably throughout a typical business day. Many application server implementations usually involve building out the infrastructure either to peak loads or to average loads. Building to peak loads can mean a massive over-commitment of resources. This over-commitment can be fairly large when the management and operational costs of the additional servers is included. Building out the infrastructure to the average load is a common approach for many application implementations, but can have even larger productivity costs when demand spikes. For example, in the case of email application servers, slow email access and error messages are frustrating for users and, at times, can lead to confusing email conversations as messages are delivered out of order. In extreme cases, where disk I/O has become too slow to access the database, the mail application server services can fail, disrupting operations all across the enterprise.

In either type of application server deployment implementation, a server application runs on a host that manages its own local or remote storage, and often network access as well. The size of the host server along with its storage and network capacity bounds the number of users this host can support. In the case of email applications, for example, large installations will break up the email user community into blocks of users that can be managed and hosted on each separate server. For example, email server A might service users with last names beginning with letters A through L, and email server B will host users whose last names begin with letters M through Z. Scaling such an architecture up (or down) requires physically adding (or removing) hardware resources. This approach, however, is generally time consuming and costly, and fails to address the variation in demand across different applications.

Systems have been developed to provide for virtualized access to input/output (I/O) subsystems. Some systems include virtual I/O server systems that allow multiple stand-alone application servers or virtual servers to share one or more I/O subsystems, such as host-bus adapters and network interfaces. I/O access is managed by one or more virtual I/O servers to which the application servers are connected over a network, such as a switched or routed network. To provide network QoS to the application servers, a network administrator might use software/hardware to shape the network's traffic.

A variety of network QoS mechanisms exist. For example, the token bucket is an algorithm for network traffic shaping or rate limiting. Typically, the token bucket is used to control the amount of data that is injected into a network, allowing for "bursts" of data to be sent. Conceptually, the traffic shaper employs a token bucket which contains tokens, each of which might represent a unit of bytes. A set of configurable parameters defines to the traffic shaper how many tokens are needed to transmit how many bytes and a capacity for the token bucket, say b tokens. Then in some embodiments (e.g., those that transmit packets), the filter proceeds as follows: (1) a token is added to the bucket every 1/r seconds for some constant rate r; (2) since the bucket can hold at most b tokens, if a token arrives when the bucket is full, the token is discarded; (3) when a packet of n bytes arrives, N (N is proportional to n as defined by configurable parameter) tokens are removed from the bucket, and the packet is sent to the network; and (4) if fewer than n tokens are available, no tokens are removed from the bucket, and the packet is considered to be non-conformant.

The token bucket algorithm allows bursts of up to b bytes, but over the long run the output of conformant packets is limited to the constant rate, r. A non-conformant packet might be treated in one of the following ways: (a) it might be dropped; (b) it might be enqueued for subsequent transmission when sufficient tokens have accumulated in the bucket; or (c) it might be transmitted, but marked as being non-conformant, possibly to be dropped subsequently if the network is overloaded.

Hierarchical token bucket (HTB) is a variation on the token bucket algorithm. HTB was implemented by Martin Devera as part of the Linux kernel; the Linux man page for HTB is tc-htb(8). As its name suggests, HTB involves a number of token bucket filters arranged in a hierarchy. Devera's implementation apparently builds upon the three-color token bucket filter described in RFC 2697, A Single Rate Three Color Marker, (September 1999), published by the Internet Engineering Task Force (IETF).

A variety of networking and fabric interconnection technologies exist. InfiniBand®, for example, is a switched fabric communications link primarily used in high-performance computing. InfiniBand is designed to be scalable and its features include quality of service (QoS) and failover. The InfiniBand architecture specification defines a connection between processor or application nodes and high performance I/O nodes such as storage devices. Ethernet is another example network technology used, for instance, in Local Area Networks (LANs). Ethernet stations communicate by sending each other data packets, small blocks of data that are individually sent and delivered. Each Ethernet station is assigned a single 48-bit MAC address, which is used both to specify the destination and the source of each data packet. Network interface controllers (NICs), except when running in a promiscuous mode, normally do not accept packets addressed to other Ethernet stations.

SUMMARY

In particular embodiments, the present invention provides methods, apparatuses, and systems directed to the control of the injection rate of traffic in a distributed system where virtualized I/O subsystem traffic between servers and I/O subsystems or devices is carried over a network, such as a switch fabric. In some embodiments, such control occurs through the use of hierarchical token bucket mechanisms. In some implementations, the present invention provides a synchronous mechanism that accesses an HTB layer prior to sending data frames or packets across the network.

DESCRIPTION OF THE DRAWINGS

FIG. 2 is a component diagram showing hardware components of a virtual I/O server according to one implementation of the invention.

FIG. 3 is a schematic diagram illustrating a protocol stack and software modules of a virtual I/O server according to one implementation of the invention.

FIG. 4 is a component diagram showing hardware components of an application server according to one implementation of the invention.

FIG. 5 is a schematic diagram illustrating a protocol stack and software modules of an application server according to one implementation of the invention.

FIGS. 8A and 8B illustrate another example I/O subsystem virtualization architecture, according to another implementations of the invention.

FIGS. 13A to 13D are tables illustrating operation of an example HTB module.

DESCRIPTION OF EXAMPLE EMBODIMENT(S)

Figure 1:
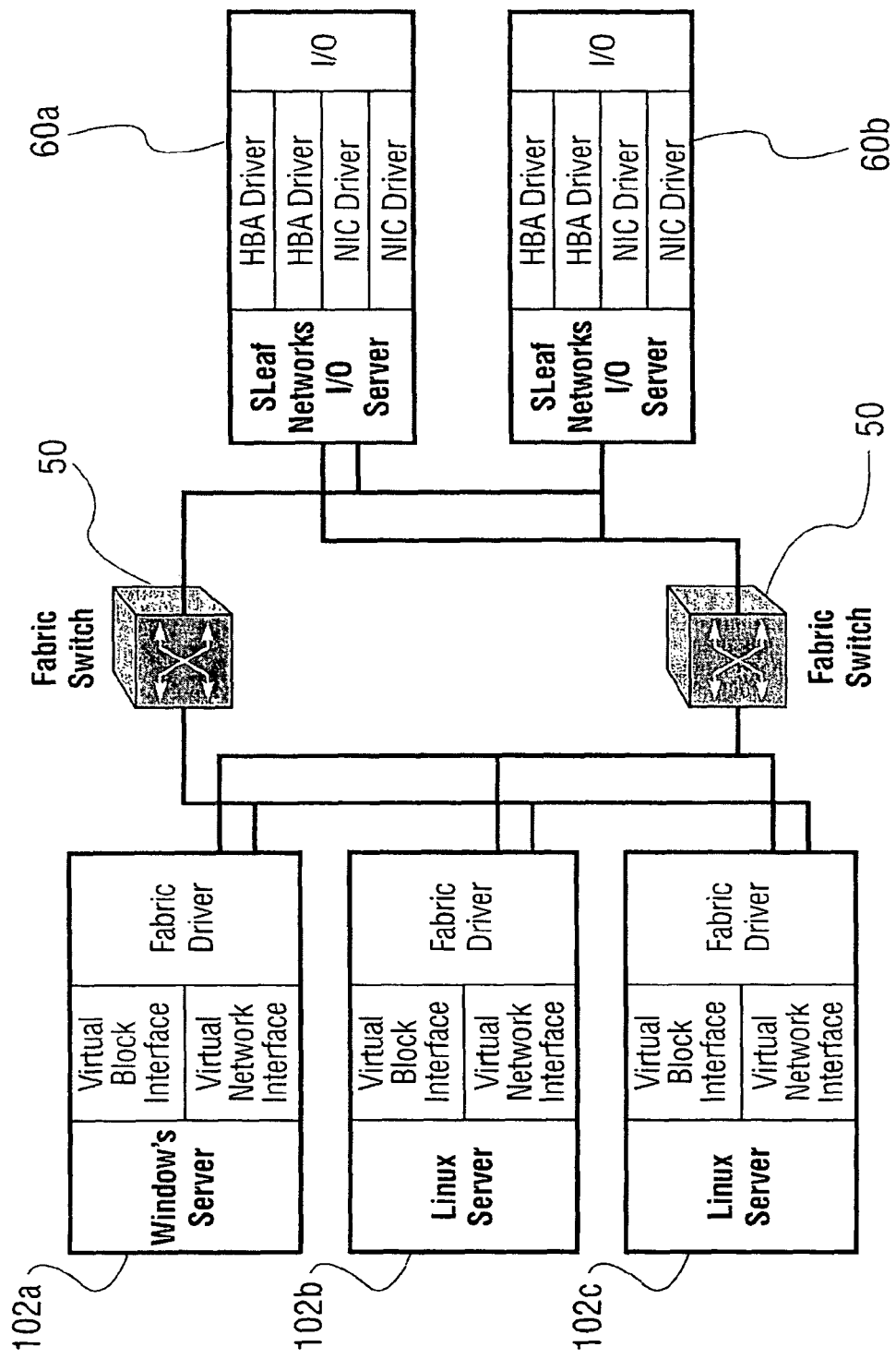
FIG. 1 is a functional block diagram illustrating an I/O switch fabric interconnecting application servers and virtual I/O servers.

The following example embodiments are described and illustrated in conjunction with apparatuses, methods, and systems which are meant to be examples and illustrative, not limiting in scope.

A. Hardware, Software, and Protocol Component Overview

The following provides an overview of the hardware components and functional modules of a virtual I/O server 60 and an application server 102 according to one possible implementation of the invention.

A.1. Virtual I/O Server Protocol Stack and Hardware Architecture

In particular implementations, two components of the virtual I/O server 60 are multiplexer 308 and encapsulation 306 modules. In one implementation, the multiplexer 308 is a kernel module which transfers incoming requests from the application servers 102 to the appropriate native HBA or NIC driver attached to the virtual I/O server 60. Encapsulation modules tunnel I/O traffic over the I/O switch fabric between virtual device interfaces on the application server 102 and the multiplexer of the virtual I/O server 60. Together, these modules or drivers, in one implementation, are responsible for receiving requests from application servers 102, setting up and tearing down intermediate I/O buffers, passing the I/O requests to the appropriate real HBA or NIC driver, processing the response from the HBA and/or NIC driver and returning the results of the request to the initiating application server.

The multiplexer 308 can also be configured to provide Quality of Service (QoS) to the client application and servers. Available I/O fabric bandwidth, for example, can be apportioned to the client application servers by the multiplexer 308. A management console interfaces with the multiplexer code to allow dynamic modification of the QoS levels for the clients. Possible QoS schemes include server prioritization, weighted round-robin and a lottery scheduler. In one implementation, possible QoS parameters can be computed based on a percentage of calculated I/O server throughput. Throughput can be calculated based on theoretical bus throughputs adjusted by the appropriate overhead factor, or throughput can be calculated on a running basis based upon peak load capabilities. In addition, each application server can be assigned a percentage of the available bandwidth.

FIG. 3 illustrates the protocol stack and modules of a virtual I/O server 60 according to one possible implementation of the invention. I/O fabric PHY interface 302 generally refers to the hardware interface or interconnection to the I/O switch fabric, while I/O fabric driver stack 304 generally refers to one or more drivers directed to the communication of messages across the I/O switch fabric. In one implementation, I/O fabric driver stack 304 comprises an Infiniband host channel adapter (HCA) driver layer and an Infiniband access layer (handling connection management tasks across the I/O switch fabric). Encapsulation module 306 handles encapsulation processes associated with the virtualization of I/O subsystems between one or more application servers 102 and one or more network interfaces 916 and host bus adapters 918 attached to virtual I/O server 60 (see FIG. 2). Multiplexer 308 is operative to direct message or data flow between various components of virtual I/O server 60, as described in more detail below.

Host bus PHY interface 320 generally refers to the physical hardware interface or adapter that interconnects virtual I/O server 60 to a mass storage system or storage network system. Virtual I/O server 60 further includes storage driver stack 322, which provide the native driver level interfaces to host bus PHY interface 320. Virtual block interface 326 allows for storage system access over the I/O switch fabric. When a request is received by the encapsulation module 306 on the virtual I/O server 60, the request is passed to the multiplexer 308 which routes the request to the virtual block interface 326 which inserts to the device queue. The virtual block interface 326, in one particular implementation, may receive SCSI commands from an application server 102 over the I/O fabric, and make calls into the SCSI layer of storage driver stack 322. In another implementation, virtual block interface 326 receives generic read, write and/or other commands that are translated into the appropriate protocols (e.g., SCSI, Intelligent Peripheral Interface (IPI), Integrated Drive Electronics (IDE), etc.).

Network PHY interface 340 generally refers to the physical hardware that provides a connection to a network (such as a LAN). Link layer driver 342 and network link level device interface 344 provide the software level interfaces to network PHY interface 340. In one implementation, network PHY interface 340, link layer driver 342 and network link level device interface 344 together provide link layer network services according to the IEEE 802.3 (Ethernet) standard. In one implementation, included in these functions are various filter drivers, as well as bridging and link bonding functions. For example, the networking protocol stack includes bridge layer 360, which performs bridging functions relative to the virtual MAC addresses of the application servers 102. In one implementation, the network PHY interface 340 operates in a promiscuous mode accepting all frames and passing them up the protocol stack for a higher-level decision on whether to bridge or reject them. The bridge layer 360 is operative to forward frames received at network PHY interface 340 to virtual network interface layer 346. In one implementation, bridge layer 360 is operative to bridge native Ethernet frames to virtual network interface layer 346, which maps the virtual MAC address in the received Ethernet frame to the switch fabric identifier (e.g., an HCA GUID or LID) of the application server 102. The bridge layer 360, in one implementation, also handles broadcast and multicast Ethernet traffic by replicating the broad/multi-cast packets to each of the interfaces (virtual or physical) associated with the bridge layer 360. Multiplexer 308 and encapsulation module 306 operate to forward (e.g., tunnel) the Ethernet frame to the virtual network interface 220 of application server 102 over the I/O switch fabric. In addition, virtualization of the link layer interfaces across the I/O switch fabric, in one implementation, is transparent to higher layer network protocol functions, such as DHCP, ARP, TCP and the like.

Figure 7:
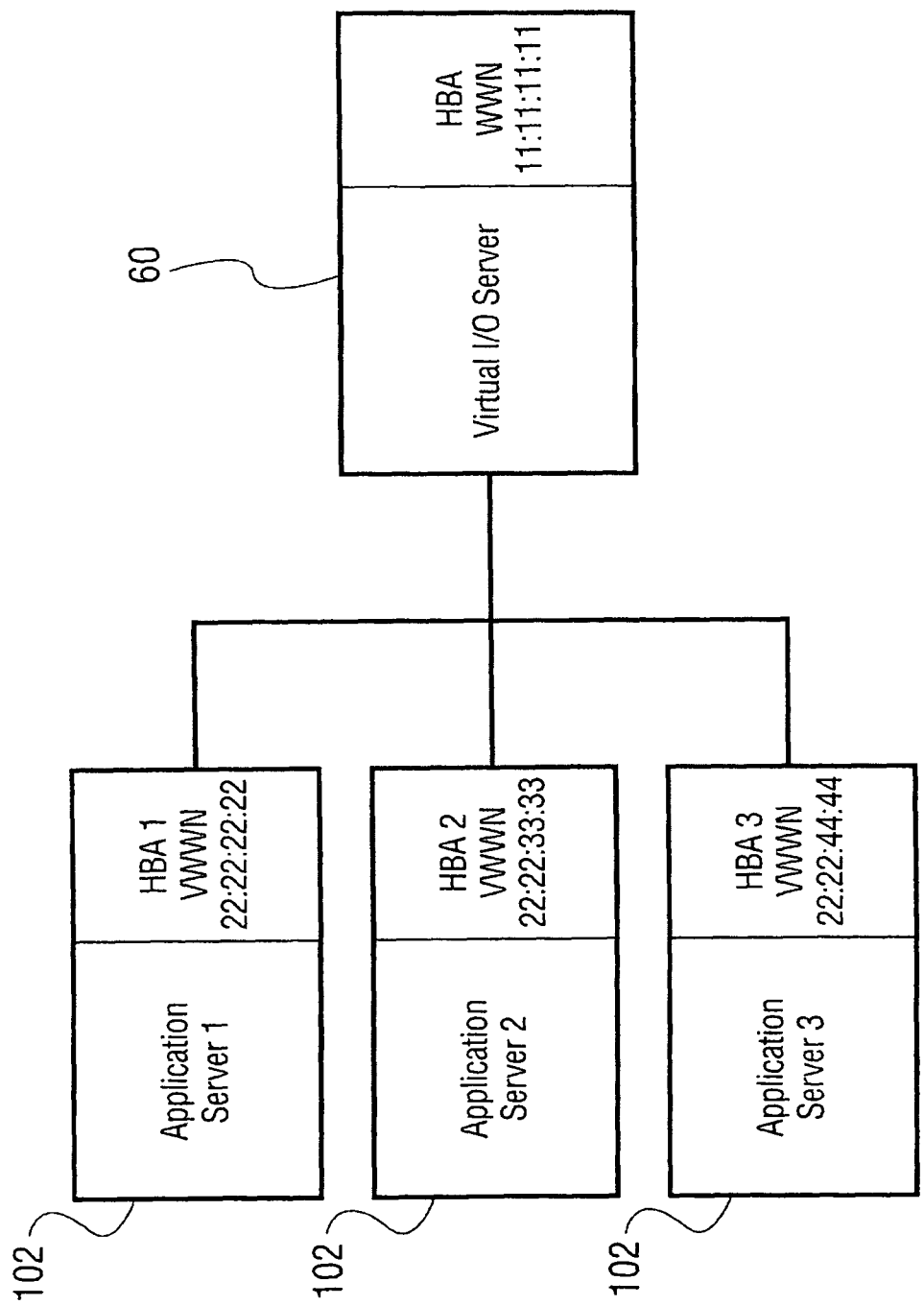
FIG. 7 is a functional block diagram illustrating the assignment of virtual World Wide Names to application servers according to one implementation of the invention.

As FIG. 3 shows, virtual I/O server 60 also includes management console 399 and management module 398. In one implementation, management console 399 is a user space application that supports user interfaces and workflows that facilitate configuration of the Virtual Compute Environment. In one implementation, management console 399 passes configurations entered by operators as configuration events to a management module 398, which in one implementation is a kernel space module. Using the management console 399, an operator, for example, may configure one or more virtual block devices and/or virtual network interfaces for an application server 102. For example, when adding an application server 102 to the VCE, an operator may assign a virtual MAC address, which ultimately is provided to the virtual network interface driver 220 of the desired application server 102. The management console 399 also allows the network administrator to configure virtual World Wide Names for the application servers 102. In one implementation, a typical configuration for an application server 102 includes 1) one or more link layer network interface profiles (each including a virtual MAC address), and 2) one or more block device configurations. In one implementation, after receipt of a configuration event, management module 398 may provide configuration data to one or more layers or drivers of the virtual I/O server 60. For example, if an operator configures a new virtual MAC address for an application server 102, the management module 398 passes the new virtual MAC address to the virtual network interface 346 in association with an identifier for the application server 102 (such as the GUID of the HCA of the application server 102). In addition, an operator can configure a virtual WWN for an application server 102, which causes the virtual block interface 326 of virtual I/O server 60 to expose the virtual WWN to a storage area network. (See FIG. 7).

In a SAN, an application server generally accesses storage through a Fibre Channel card or HBA of a virtual I/O server 60. During the setup of the application server, the Virtual I/O Server administrator, in one implementation, allocates part or all of a virtual or physical HBA of the virtual I/O server 60 available to a particular application server. The storage devices discovered with each allocated HBA appears on the application server 102 as a block storage device to the operating system. This virtual HBA uses an interface to communicate with the operating system. In one implementation, the virtual block storage device is indistinguishable from a physical one to the operating system of the application server, the Fibre Channel switch, and the SAN. To implement this, each association between an application server and an HBA of the virtual I/O server is assigned a virtual World Wide Name (VWWN), just as a physical HBA has a World Wide Name (WWN), to provide a unique identifier for the application server to the storage network. The VWWN can be used just like a WWN for normal LUN masking or zoning from either the target device or SAN fabric. The SAN administrator can use the VWWN of the application server to perform the zoning. The VWWN only grants access to assigned devices. Therefore, even though two application servers may be connected to the same physical HBA, their different VWWNs ensure they do not access each other's data and thus maintain compatibility with current SAN security models.

As FIG. 3 illustrates, in one implementation, the modules and layers discussed above are kernel modules operating in kernel space. However, the virtual I/O server 60 may be implemented in connection with operating systems that have no distinction between kernel space and user space. Additionally, some of the functionality discussed here can be embodied in modules that execute in user-space. Also illustrated in FIG. 3 is a management console 399 that facilitates the configuration of virtual I/O server 60 and/or one or more application servers 102.

FIG. 2 is a functional block diagram showing the hardware components of a virtual I/O server 60 according to one implementation of the invention. In one implementation, virtual I/O server 60 comprises a processor 902, a cache memory 904, an operating system, and one or more software, firmware and/or hardware modules or drivers directed to the functions described herein. Additionally, virtual I/O server 60 includes an input/output (I/O) bus 906 and system memory 914. A host bridge 910 couples processor 902 to I/O bus 906. I/O bus 906 also couples to I/O fabric interface 912, network interface 916 and host bus adapter 918. Virtual I/O server 60 may also include additional components, such as a management console port (e.g., a serial or USB port), mass storage (e.g., hard disk drives), ROM, EEPROMs, etc. Collectively, these elements are intended to represent a broad category of computer hardware systems, including but not limited to general purpose computer systems based on the AMD Opteron or Intel Pentium® processor, as well as any other suitable processor. In one implementation, the virtual I/O server includes a dual processor AMD Opteron system providing a mix of PCI-Express and PCI-X capabilities. The virtual I/O server 60 can also be embodied in other hardware architectures and computing platforms, such as embedded devices and appliances.

In one implementation, I/O fabric interface 912 provides communication between virtual I/O server 60 and the I/O switch fabric. In one implementation, I/O fabric interface 912 is a host channel adapter (HCA) implementing the Infiniband standard (above). Network interface 916 provides communication between virtual I/O server 60 and any of a wide range of networks, such as an Ethernet (e.g., IEEE 802.3, IEEE 802.11, etc.) or token-ring networks, etc. Host bus adapter (HBA) 918 provides an interface to a mass storage device directly, or a storage area network (SAN). A network interface can also be employed to access one or more network attached storage (NAS) systems. Typical host bus adapters can include one or more of IDE, SATA, SCSI, RAID controller, and FiberChannel cards which interface to one or more storage media devices over a storage area network.

Virtual I/O server 60 may include a variety of system architectures, and various components may be rearranged. For example, virtual I/O server 60 may include additional processor cores or modules. In addition, cache 904 may be on-chip with processor 902. Alternatively, cache 904 and processor 902 may be packed together as a "processor module," with processor 902 being referred to as the "processor core." Furthermore, in some implementations, not all components couple directly to I/O bus 906. For example, in one implementation, virtual I/O server 60 may include a high performance I/O bus 906 coupled to processor 902 (via host bridge 910) and system memory 914, and a standard I/O bus (not shown) coupled to I/O fabric interface 912, network interface 916 and host bus adapter 918. In such an implementation, an I/O bus bridge communicably couples the high performance I/O bus 906 and the standard I/O bus. Furthermore, the hardware system may include additional components, such as additional processors, storage devices, or memory modules.

In one embodiment, the operations of virtual I/O server 60 described herein are implemented as a series of software routines executed by the hardware system described above. These software routines comprise a plurality or series of instructions to be executed by a processor in a hardware system, such as processor 902. Initially, the series of instructions are stored on a storage device, such as a mass storage unit. However, the series of instructions can be stored on any suitable storage medium, such as a diskette, CD-ROM, ROM, EEPROM, etc. One or more functions of the virtual I/O server 60 can also be implemented as firmware or hardware. Furthermore, the series of instructions need not be stored locally, and could be received from a remote storage device, such as a server on a network, via network/communication interface 916 or I/O fabric interface 912. The instructions are copied into memory 914 and then accessed and executed by processor 902. An operating system manages and controls the operation of virtual I/O server 60. The operating system provides an interface between the functional modules and the hardware components of the system. According to one embodiment of the present invention, the operating system is the LINUX operating system. However, the present invention may be used with other suitable operating systems, such as the Apple Macintosh Operating System, available from Apple Computer Inc. of Cupertino, Calif., UNIX® operating systems, the Windows® 95/98/NT/XP operating system, available from Microsoft Corporation of Redmond, Wash., and the like.

Figure 8B:
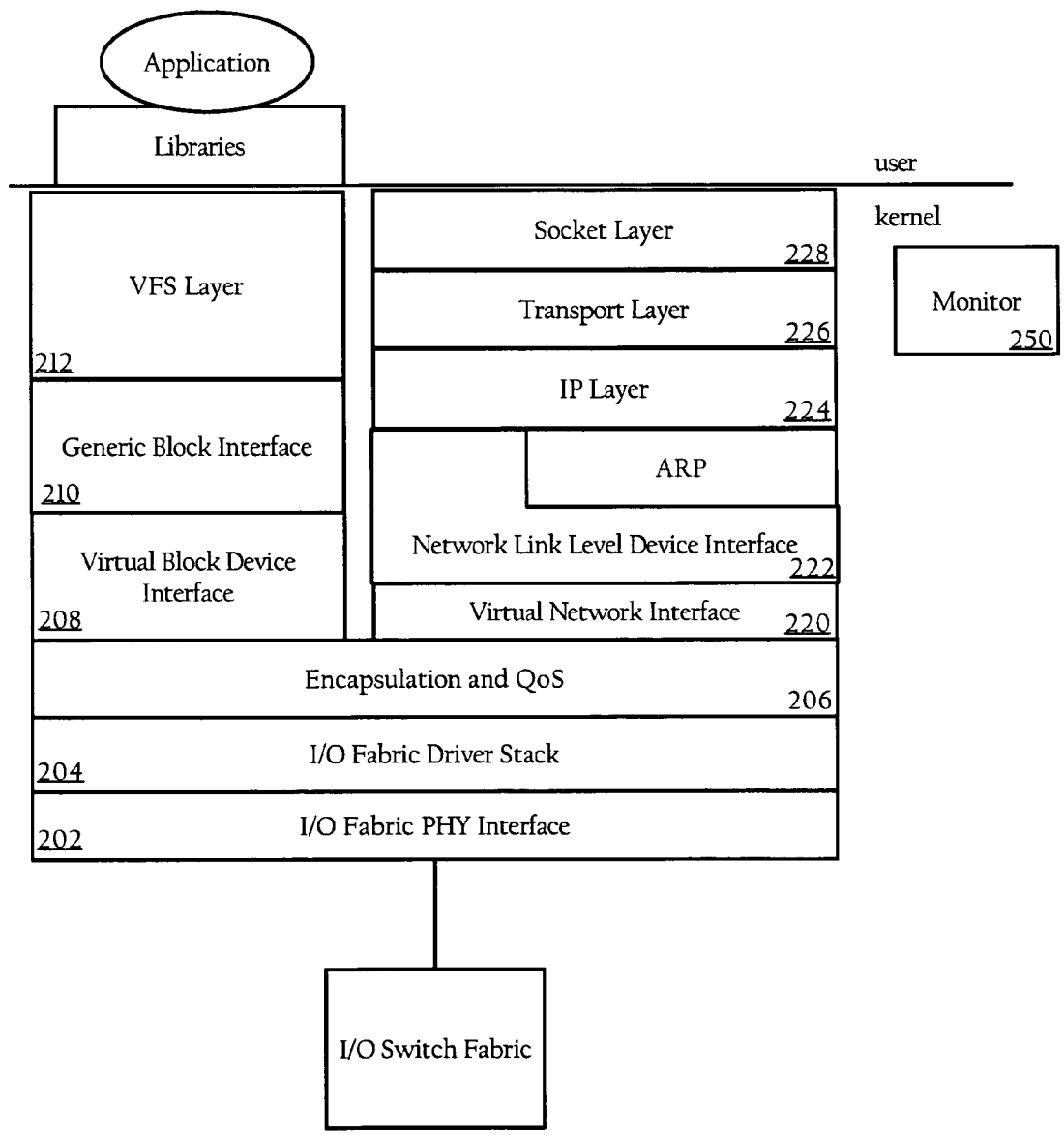

FIGS. 8A and 8B illustrates an alternative implementation of the virtual I/O server 60 and application server 102, respectively. In the implementation illustrated, the virtual I/O server 60 omits multiplexer 308. In yet other implementations, the encapsulation functions of module 306 can be incorporated into virtual block interface module 326 and virtual network interface 346 of virtual I/O server 60, while the functions of encapsulation module 206 can be incorporated into virtual block interface module 208 and virtual network interface 220 of application server 102 (not shown). In such an implementation, the corresponding virtual interface of application server 102 and virtual I/O server 60 can communicate directly over the I/O fabric using separate logical fabric connections (such as RC Queue Pairs in implementations using Infiniband as the I/O fabric). Virtual block interface module 346 of virtual I/O server 60 can provide the mapping capabilities between virtual block devices of the application servers 102 and physical block devices.

A.2. Application Server Protocol Stack and Hardware Architecture

The application server 102 may be implemented with any suitable hardware platform, including a commodity blade platform with a PCI-Express bus. As discussed herein, an interface or adapter, in one implementation, operably connected on a PCI-Express bus is connected to one or more virtual I/O servers 60 through one or more fabric switches. In one implementation, the application server 102 includes a variety of conventional network and storage stack drivers and modules. Inserted into the network and storage protocol stacks are virtual interface drivers configured to intercept block device and network I/O requests, at the device level, and pass them through the I/O fabric interface to a virtual I/O server 60 for processing. The virtual block device driver 208, for example, receives block requests for a given device and passes them to the virtual I/O server 60 over the I/O switch fabric. Similarly, virtual network interface 220, in one implementation, emulates an Ethernet NIC. In one implementation, this driver plugs in at the bottom of the network stack and provides an Internet Protocol address bridged by the Virtual I/O server 60 onto a LAN.

Virtualization at the device level, in some implementations, achieves one or more advantages. For example, particular implementations of the virtualization scheme described herein allow for use of existing computing infrastructures, including hardware and software, while abstracting the operation of the intermediate I/O switch fabric. Furthermore, in some implementations, the virtual I/O server uses existing device drivers to communicate with I/O subsystems eliminating the need to qualify new hardware or software for interacting with the I/O subsystems. In addition, in some implementations, the operating system kernel need not be modified since the device drivers and other stack modules can be loaded at boot time.

When an application server 102 is booted, it will contact the virtual I/O server 60 over the fabric to obtain the device configuration (including, for example, virtual block devices and virtual network interfaces) from the virtual I/O server 60. The virtual block interface or device driver 208, in one implementation, registers itself as a standard PCI driver (emulating a peripheral class device driver). When the PCI scan code invokes the driver scan entry point to determine if there is any physical PCI hardware managed by this driver, virtual block device driver 208 communicates over the fabric with the I/O processor management software to retrieve the device configuration that should be presented to the operating system hosted on application server 102. In one implementation, it responds to the operating system as if it has claimed a device on the PCI bus, and when invoked by the SCSI stack code, will present the appropriate device configuration. In another implementation, the virtual block device driver 208 registers with the generic block layer 210 when it is loaded. The virtual block device driver 208 will appear to the application server 102 as if it were a block device. The devices, in one implementation, are named using the standard SCSI device naming scheme (similar to the methods used by the Linux IDE-SCSI and USB mass storage class drivers). To support network access, devices, in one particular implementation, are named as virtual interfaces. The interface name, in one implementation, is N, where N is the next available number beginning with zero.

Mapping device names on application servers 102 to the device name used on the virtual I/O server 60 is a cooperative effort between the virtual interface modules of the application server (which presents a set of names from the SCSI device namespace to the operating system) and the multiplexer 308 of virtual I/O server 60 which maps the incoming requests from the application servers 102 to the appropriate device driver on the virtual I/O server 60.

The following describes various protocol stack components and modules of the application server 102 according to one possible implementation of the invention. FIG. 5 illustrates the protocol stack and modules of an application server 102 according to one possible implementation of the invention. I/O fabric PHY interface 202 generally refers to the hardware interface or interconnection to the I/O switch fabric, while I/O fabric driver stack 204 generally refers to one or more drivers directed to the communication of messages across the I/O switch fabric. In one implementation, I/O fabric driver stack 204 comprises an Infiniband host channel adapter (HCA) driver layer and an Infiniband access layer. In one implementation, the I/O fabric driver stack and I/O fabric PHY interface can employ the reliable RC connections supported by the Infiniband standard. Equivalent protocols can be used for reliable and in-order message delivery across the I/O switch fabric. Furthermore, in one implementation, the I/O fabric PHY interface 202 and associated drivers supports remote direct memory access (RDMA), allowing for read and write operations directly with system memory without involvement of a central processing unit. Still further, other technologies (e.g., PCI express) and protocols (e.g. link layer protocols, such IEEE 802.3 (Ethernet)) across the I/O switch fabric can be used.

Encapsulation module 206 handles encapsulation processes associated with the virtualization of I/O subsystems between the application server 102 and one or more network interfaces 916 and host bus adapters 918 attached to virtual I/O server 60. In one implementation, encapsulation module 206 presents a generic interface to higher layer virtual interfaces, such as virtual block device interface 208. In one implementation, encapsulation module 206 is operative to consume messages from higher layers of the protocol stack, encapsulate messages with a header, and transmit messages, using I/O fabric protocol dependent modules, across the I/O switch fabric to a remote encapsulation module 306 of virtual I/O server 60.

Virtual block device interface 208 presents a virtual block device interface to generic block interface 210. At initialization, the virtual block device interface 208 interacts with virtual I/O server 60 to receive a block device configuration, and registers as a provider of block storage to the operating system. In one implementation, generic block interface 210 is a native, generic block interface standard to the underlying operating system of application server 102. Virtual file system (VFS) layer 212 provides a generic file system interface to applications and forwards requests to file system-specific code (such as FAT, EXT2, ISO9660, etc). For example, when an application issues a read system call, the system call may transfer control from user mode into the kernel and invokes the read VFS function. Internal kernel state associated with the open file directs the VFS read function to invoke the file-system specific read function, which will perform mapping operations to map the byte offset in the file to the physical block on the media. It then requests that block from the generic block interface 210 (which invokes the virtual block device interface 208). In one implementation, virtual block device interface 208 is operative to establish a connection with virtual block interface 326 of virtual I/O server 60 to forward commands or other messages. In one implementation, this connection is a persistent, session layer connection utilizing a reliable transport protocol.

Virtual network interface 220 presents a virtual link layer interface to higher layers of the protocol stack. In one implementation, the virtual network interface 220 is used to access network interfaces of the virtual I/O server 60 over the I/O switch fabric, using the encapsulation module 206 to provide the interfaces to establish and maintain the connection. In one implementation, the virtual network interface layer 220 is configured with a link layer network interface profile (including a virtual media access control (MAC) address) that it receives from a virtual I/O server 60. In one implementation, the link layer network interface profile may include other attributes, such as a supported speed or bandwidth, and other NIC attributes that are presented to an operating system. In one implementation, above the virtual network interface 220 in the protocol stack are standard networking protocol implementation layers, such as network link level device interface 222, IP layer 224, transport layer 226 and socket layer 228.

In one implementation, application server 102 also includes a monitor module 250. In one implementation, monitor module 250 is a kernel loadable module that handles various management tasks associated with the VCE. For example, the monitor module 250 is operative to automatically discover nodes (e.g., other application servers 102, virtual I/O servers 60) connected to the I/O switch fabric. In one implementation, the monitor module 250 broadcasts messages, and monitors for messages broadcast by other nodes, such as application servers 102 and virtual I/O servers 60. In one implementation, monitor module 250 is also operative to provide a heartbeat signal or message to one or more virtual I/O servers 60, and to monitor for similar heartbeats from virtual I/O servers 60. In one implementation, when an application server 102 is initialized, the monitor module 250 automatically discovers one or more virtual I/O servers 60. Other modules of the application server 102 can then contact the discovered virtual I/O server(s) 60 to obtain configuration information. In addition, the heartbeat functionality can be used to allow the application server 102 to failover to an alternate virtual I/O server 60 in the event of fabric failure, I/O server failure, or other problems.

After discovery of one or more virtual I/O servers 60 by the monitor module 250, the virtual block device interface 208 and the virtual network interface 220 of application server 102, in one implementation, are operative to establish unicast connections with the virtual I/O server 60. As discussed herein, the virtual device and network layers initially use the connection to obtain configuration information to present to the operating system of the application server 102. In one implementation, virtual block device interface 208 is operative to maintain a connection with virtual block interface 326 of virtual I/O server 60, while virtual network interface 220 is operative to maintain a connection with virtual network interface 346. In one implementation, the respective connections are persistent, reliable connections involving a handshake protocol to set up the connection. In addition, the respective connections, in one implementation utilize port numbers to identify the connections. For example, the virtual block device interface 208 may transmit an initial handshake message, requesting a type of service and identifying a port, to the virtual I/O server 60. The multiplexer 308, in one implementation, routes the message to the virtual block interface 326 of virtual I/O server 60, which transmits a responsive message. After the initial handshake, other protocols or message flows can be initiated, such as authentication, configuration, and the like. Thereafter, I/O and control/management traffic between the respective modules of the application server 102 and virtual I/O server 60 are transmitted over the connections.

Application server 102 can take a variety of forms. For example, application server 102 may range from a large mainframe system to commodity personal computer system or server system architectures. FIG. 4 illustrates for didactic purposes a hardware system, which may be used to implement an application server 102. In one implementation, application server 102 includes a processor 802, a cache memory 804, and one or more software, firmware and/or hardware modules or drivers directed to the functions described herein. Additionally, application server 102 includes an input/output (I/O) bus 806 and system memory 814. A host bridge 810 couples processor 802 to I/O bus 806. I/O bus 806 also couples to I/O fabric interface 812 to the switch fabric. Application server 102 may also include additional components, such as a management console port (e.g., a serial or USB port), mass storage (e.g., hard disk drives), ROM, EEPROMs, etc. Collectively, these elements are intended to represent a broad category of computer hardware systems, including but not limited to general purpose computer systems based on the AMD Opteron or Intel Pentium® processor, as well as any other suitable processor. Furthermore, in one implementation, application server 102 is housed in a blade housing suitable for mounting in a rack or other server blade housing.

In one implementation, I/O fabric interface 812 provides communication between application server 102 and virtual I/O server 60 over the I/O switch fabric. In one implementation, I/O fabric interface 812 is a host channel adapter (HCA) implementing the Infiniband standard (above). However, I/O fabric interface 812 may be any suitable communications interface, such as an Ethernet (e.g., IEEE 802.3) network interface.

Application server 102 may include a variety of system architectures, and various components may be rearranged. For example, application server 102 may include addition processor cores or modules. In addition, cache 804 may be on-chip with processor 802. Alternatively, cache 804 and processor 802 may be packed together as a "processor module," with processor 802 being referred to as the "processor core." Furthermore, in some implementations, not all components couple directly to I/O bus 806. For example, in one implementation, application server 102 may include a high performance I/O bus 806 coupled to processor 802 (via host bridge 810) and system memory 814, and a standard I/O bus (not shown) coupled to I/O fabric interface 812 and possibly other system components. In such an implementation, an I/O bus bridge communicably couples the high performance I/O bus 806 and the standard I/O bus. Furthermore, application server 102 may include additional components, such as additional processors, storage devices, or memory modules.

In one embodiment, the operations of application server 102 described herein are implemented as a series of software routines executed by the hardware system described above. As FIG. 5 illustrates, application server 102 includes one or more applications executed in user space, as well as the storage and network protocol stacks and drivers discussed herein. These software routines comprise a plurality or series of instructions to be executed by a processor in a hardware system, such as processor 802. Initially, the series of instructions are stored on a storage device, such as a mass storage unit. However, the some or all of the series of instructions are stored remotely from application server 102. The instructions are copied into memory 814 and then accessed and executed by processor 802. An operating system manages and controls the operation of application server 102. The operating system provides an interface between the functional modules and the hardware components of the system. According to one embodiment of the present invention, the operating system is the LINUX operating system. However, the present invention may be used with other suitable operating systems, such as the Apple Macintosh Operating System, available from Apple Computer Inc. of Cupertino, Calif., UNIX® operating systems, the Windows® 95/98/NT/XP operating system, available from Microsoft Corporation of Redmond, Wash. and the like.

B. Example Operational Scenarios

B.1. Accessing Storage Devices Over I/O Fabric

In one implementation, virtual block device interface 208 and encapsulation module 206 enable application server 102 to transparently access one or more storage systems over the I/O fabric. As discussed above, virtual I/O server 60 includes one or more host bus adapters that are operably connected to directly attached storage devices (e.g., directly attached SCSI devices) or a storage area network. For example, in one implementation, the virtual I/O server 60 is connected via one or more host bus adapters (HBAs) to Fibre Channel switches, which in turn are connected to one or more Fibre Channel storage system(s). The virtual I/O server 60 and the storage device(s) communicate via the Fibre Channel protocol suite, which allows SCSI commands to be transmitted via high-speed serial connections.

In one implementation, whether the virtual I/O server 60 operates in connection with a SAN or directly attached SCSI devices is transparent to the application servers 102. Virtual I/O server 60 identifies directly attached SCSI devices based on the conventional SCSI naming convention, including a tuple of the host bus adapter, a SCSI bus identifier, a target identifier, and a logical unit number (LUN). SANs employ World Wide Names (WWNs) to identify devices connected to the storage network. For example, a storage device can be identified by a combination of a WWN (which generally corresponds to a SCSI target identifier) and a LUN. SANs may also support a log-in protocol where initiators and targets obtain a loop identifier, which is the address used to deliver massages across the SAN.

In one implementation, virtual I/O server 60 interacts with the SAN, terminating operation of the SAN protocols and rendering its operation transparent to the application servers 102. The following description of how an application server 102 is configured for storage system access is illustrative. Using management console 399, an operator may assign a virtual WWN to an application, and associate the virtual WWN to a selected host bus adapter of the virtual I/O server 60. The host bus adapter of the virtual I/O server 60, in one implementation, supports N-port virtualization allowing it to present multiple virtual WWNs to the SAN. The configuration event causes the host bus adapter to present the virtual WWN of the application server 102 on the SAN. The virtual I/O server 60 also performs a log-in to the SAN on behalf of the SAN network to obtain a loop identifier. In addition, the virtual I/O server 60 performs SAN discovery to find one or more available storage devices available to the application server 102 on the SAN. As discussed herein, the virtual I/O server 60 presents the discovered storage device(s) to the application server 102 as virtual block devices.

Either with directly attached SCSI devices or devices discovered across the SAN, the kernel of the virtual I/O server 60 creates a node in its device name space, associating the node entry with the SCSI or SAN identifier. In one implementation, the virtual I/O server 60 also associates a persistent device identifier, such as the serial number or other vital product data, with the node entry. In implementations involving Linux, the virtual I/O server 60 provides to the application server 102 a name for the storage device(s) in the /dev name space. In one implementation, after discovery is completed for an application server, the virtual I/O server 60 stores identifiers in its local /dev name space for the discovered storage devices, where the identifiers are unique to the application server. In other words, even if the physical storage devices discovered for a given application server are the same for other application servers, virtual I/O server 60 creates device names that are unique across all application servers 102 and virtual WWNs. Accordingly, the virtual I/O server 60 maps the unique device name to the actual identifier used across the SAN or directly attached SCSI bus. In one implementation, the device name(s) provided to the application server can follow the following convention: vbX, where X begins with "a" and increments alphabetically. In one implementation, udev rules can be configured to map these arbitrary identifiers to persistent identifiers. With the block device name(s), the application server 102 may mount a file system or use one or more block devices for raw storage.

In one implementation, when an application executed by application server 102 issues a read system call, for example. The system call transfers control from user mode into the kernel and invokes the read VFS function. As discussed above, internal kernel state associated with the open file will direct the VFS read function to invoke a file-system specific read function, which will perform mapping operations to map the byte offset in the file to the physical block on the media. The VFS layer 212 then requests that block from the generic block interface 210, which invokes the virtual block device interface 208.

The virtual block device interface 208 intercepts the request from the generic block interface 210 and passes it to the encapsulation module 206. In one implementation, the virtual block device request may include one or more of the following a target device identifier, a block number, a data location, a length (e.g., number of bytes), and a read/write indication. The encapsulation module 206 encapsulates the virtual block device request with a virtual I/O header and transmits the encapsulated request in a message across the I/O fabric to the virtual I/O server 60, using the I/O fabric driver stack 204 and the I/O fabric PHY interface 202. In one implementation, the virtual I/O header includes a protocol field that identifies either the virtual block interface or a virtual network interface (which allows multiplexer 308 of virtual I/O server 60 to route the message to the appropriate protocol stack and interface for processing).

The virtual I/O server 60 receives the message at I/O fabric PHY interface 302. The I/O fabric driver stack 304 strips I/O fabric headers from the received message and passes it to encapsulation module 306. Encapsulation module 306 processes the virtual I/O header to identify the message type (block v. network interface), allowing the multiplexer 308 to route the message to the appropriate protocol stack for processing. For block device commands, the multiplexer forwards the message to virtual block interface 326, which, based on a tuple of the application server identifier and the named target storage device in the request, maps it to the physical storage device identifier on the SAN or SCSI bus, and forwards the request to the host device drivers (in one implementation, storage driver stack 322). In one implementation, the host device drivers (including a SCSI protocol stack) create a SCSI command block and transmit the command to the identified device. In one implementation, the multiplexer 308 ultimately forwards the reply received from the identified target device, performing the device name mapping in reverse, and forwards the reply message(s) to the corresponding encapsulation module 206 of the application server 102. The reply message can be a status indication of a successful write command, or the buffer requested on a read command. The command may also be an asynchronous I/O operation.

As discussed, host systems access remote storage through the I/O switch fabric. The protocol developed to allow this access is, in one implementation, largely based upon the Infiniband RDMA Protocol. User level processes typically access storage devices through a file system. Linux and Windows supports a number of these. The range supported is made possible through a unified interface known as the Virtual File System (VFS). The VFS interface provides a clearly defined interface between the kernel and the different file systems. VFS maintains internal structures, performs actions, and forwards tasks to the appropriate file system driver. The central demand made of a file system is the structuring of data to allow high performance and randomized access. A dynamic buffer cache is used to increase the performance of block devices accessed through the file system. In addition to storage accesses through a file system, a process may also access a raw or character storage device directly, bypassing the file system.

An application will perform all file I/O operations, operating on a device that it thinks is a block device, which has registered a file_operations( ) table to fulfill that requirement. In one implementation, virtual block device driver 208 receives the commands and addresses requested from the application, and uses its interfaces with encapsulation module 206 to communicate over the I/O switch fabric to forward the request to the virtual I/O server 60. The virtual block device driver 208 does not interface with the I/O fabric (HCA) devices directly, but uses encapsulation module interfaces to the access methods provided by the I/O switch fabric to maintain connections, which allow the request and responses to propagate between it and the multiplexer 308 of the virtual I/O server 60. Encapsulation module 206, in one implementation, is responsible for connection management and transport of the requests. As discussed above, requests are of the form: device number, block number, number of bytes, and type (read/write). This quadruple will be paired with the connection information for the I/O switch fabric to uniquely identify it.

Figure 5A:
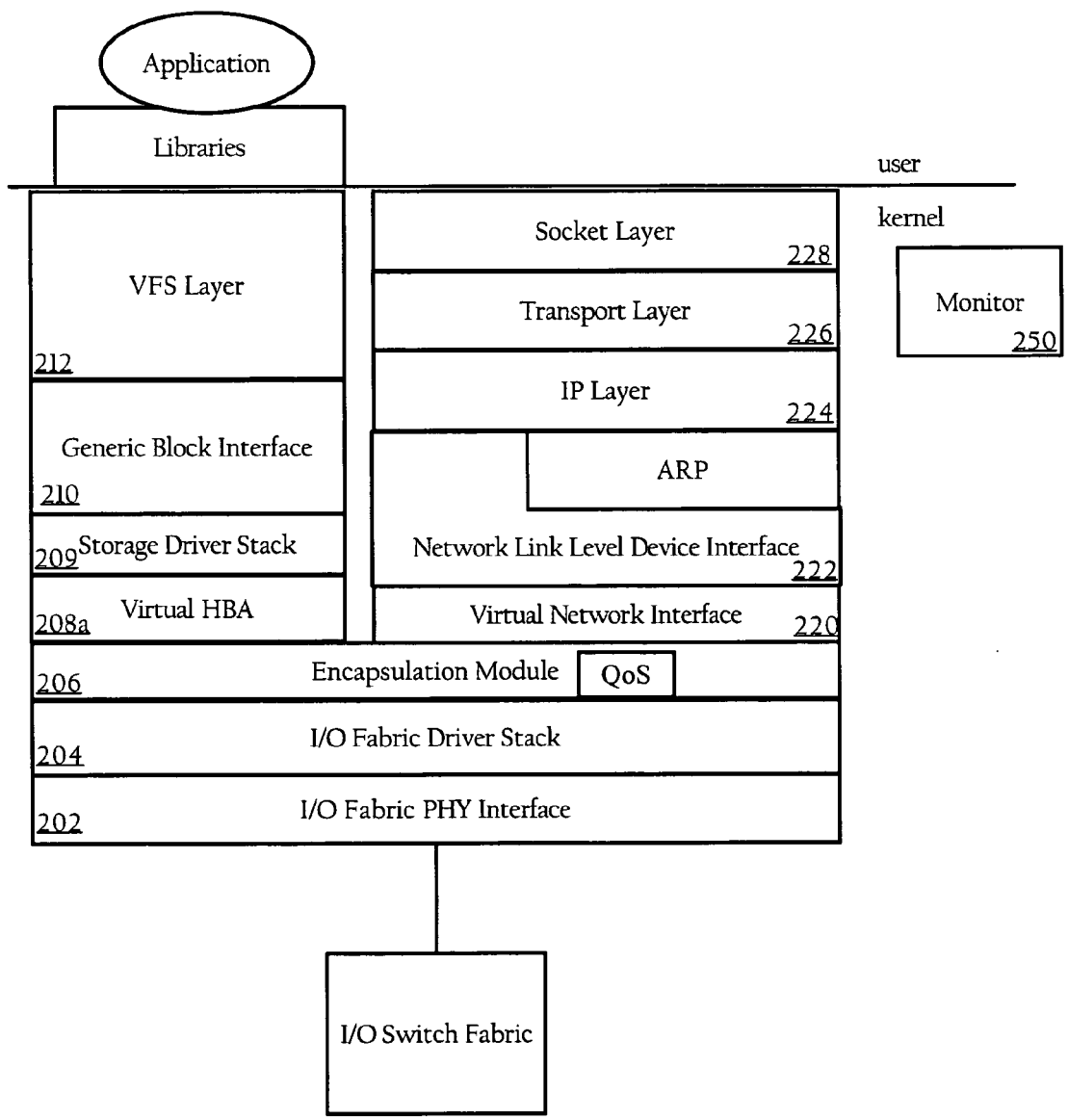
FIG. 5A is a schematic diagram illustrating a protocol stack and software modules of an application server according to an alternative implementation of the invention.
Figure 6A:
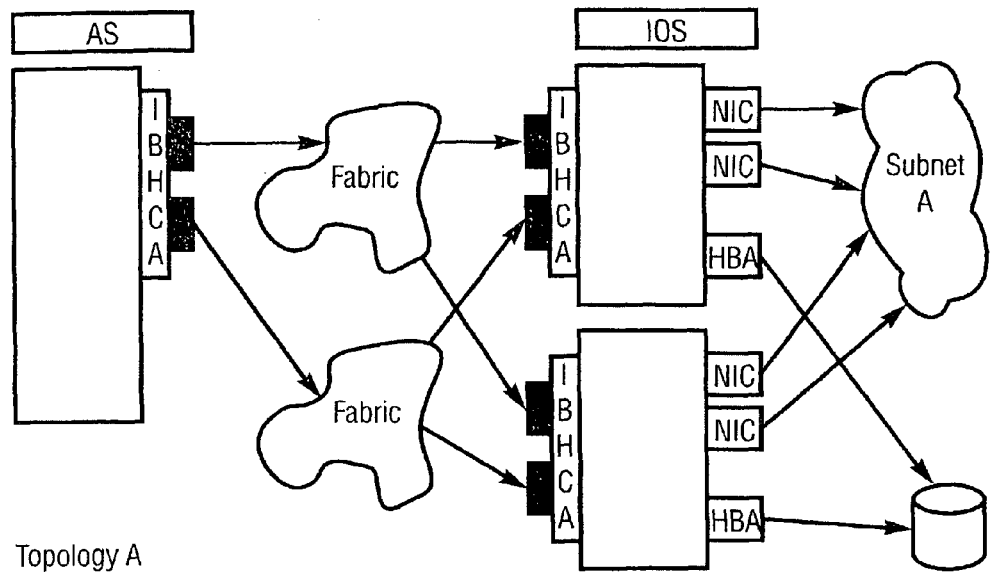
FIGS. 6a, 6b, 6c and 6d are schematic diagrams illustrating various VCE deployment scenarios.
Figure 6B:
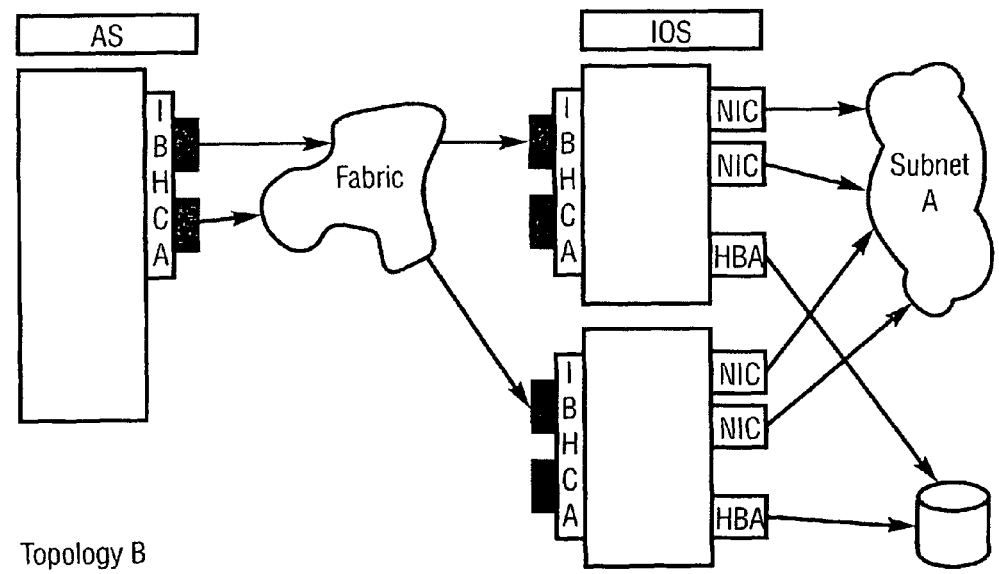
Figure 6C:
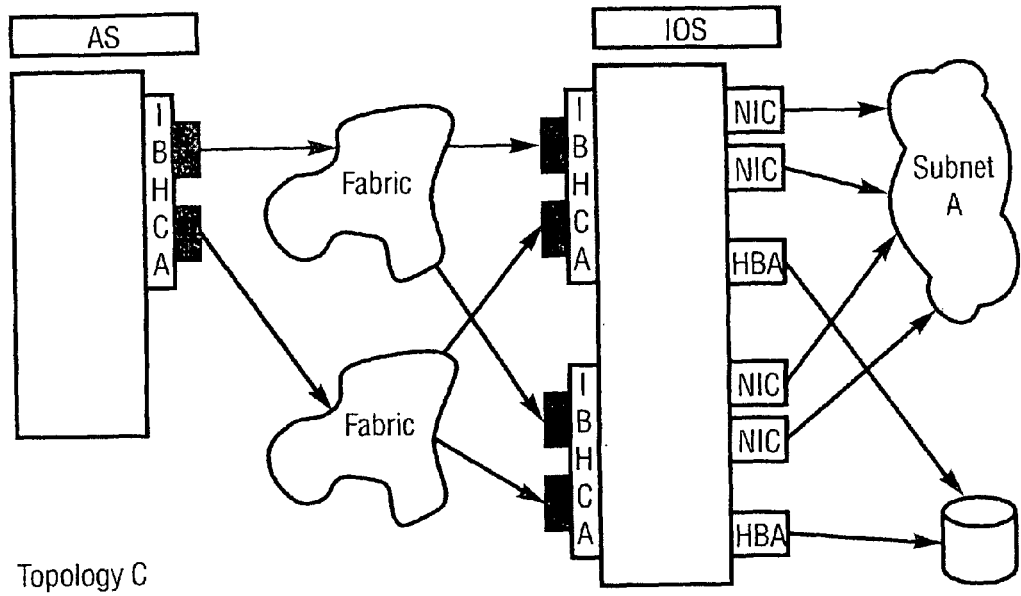
Figure 6D:
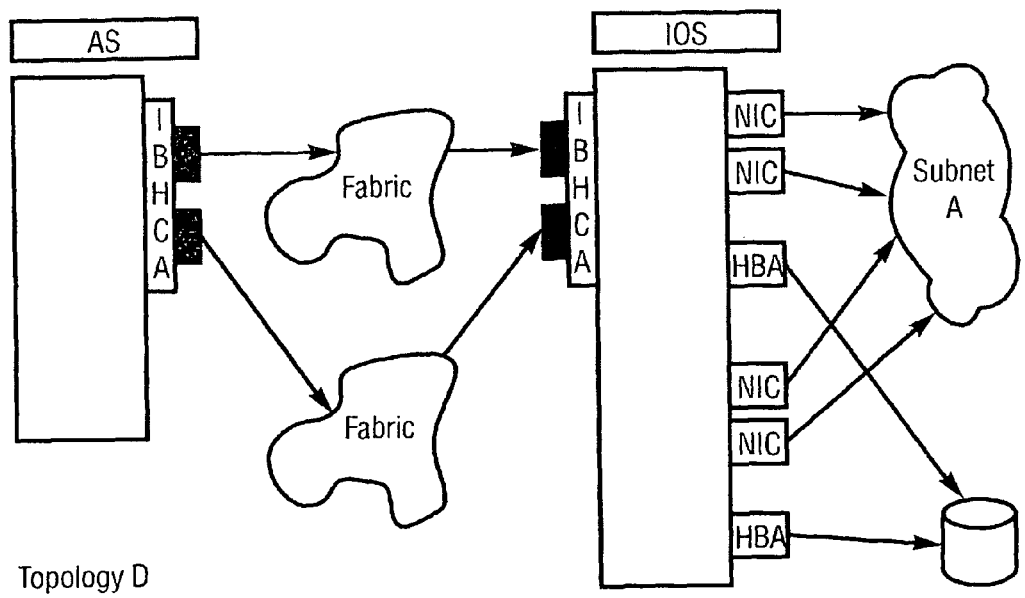

If the upper SCSI layers are traversed, then the request may be of the form of a SCSI command. For example, FIG. 5A illustrates an alternative system architecture for an application server. In the implementation shown, the storage protocol stack of application server 102 includes a storage driver stack 209 and a virtual host bus adapter (HBA) module 208*a*. In one implementation, the virtual HBA module 208*a* is assigned one or more virtual World Wide Names. In such an implementation, a physical HBA of the virtual I/O server 60 exposes these virtual World Wide Names on the SAN using N_Port_ID virtualization (NPIV) functionality. That is, many physical HBAs include one or more ports (N_Ports), where each physical N_Port may acquire and expose multiple N_Port_IDs. The storage driver stack 209 includes class drivers and a SCSI command layer. The virtual HBA module 208*a* emulates a physical host bus adapter relative to the native operating system executed on the application server 102. When a virtual HBA module is loaded as a driver, it registers itself with the storage (e.g., SCSI) driver stack 209). If the storage driver stack 209 is a SCSI stack, the storage driver stack 209 does a scan to discover available devices. During the scan, the storage driver stack 209 may pass identify commands for all possible targets within a given namespace for transmission to the virtual HBA module 208*a*.

The virtual HBA module 208a passes the commands to an encapsulation layer that encapsulates the identify commands and transmits them to the virtual I/O server 60. The host bus adapter of the virtual I/O server 60 may process the identify commands, by passing them onto the SAN or directly to a target, accessing a directory of devices available to the virtual WWN, transmitting time out responses, and the like. Responses are passed back to the virtual HBA module 208a and the storage driver stack 209. In one implementation, the virtual host bus adapter 208a passes SCSI commands, including read, write, inquiry and mode sense, from the storage driver stack 209 to the virtual I/O server 60 for execution. In this implementation, SCSI commands (as opposed to block requests) are encapsulated and transmitted across the I/O switch fabric to the virtual I/O server 60. In one implementation, the management console 399 allows an operator to configure the layer or level (block v. HBA) at which the virtualization occurs in the application server 102.

B.2. Network Access Over I/O Fabric

As discussed above, the application server 102 includes virtual network interface layer (VIF) 220 which emulates to higher layers a normal access layer in a networking stack. As with storage system access, below the virtual network interface layer 220 is the encapsulation module 206, which encapsulates network traffic for transmission across the I/O switch fabric. In one implementation, encapsulation module 206 defines the set of interfaces to access the Fabric Access Layer and is responsible for the connection management and transport over the switch fabric. Encapsulation module 206 interacts with multiplexer 308 on the virtual I/O server to transmit the I/O traffic for appropriate processing.

When an application executed on an application server 102 formulates a request or other message for transmission, it typically writes the request to socket layer 228. The request is passed to transport layer 226 which performs various actions such as connection handshakes with the destination device, assembly of the data in the request into one or more transport layer packets. In one implementation, the virtual network interface layer 220 emulates a link layer interface and includes a virtual Medium Access Control (MAC) address. In one implementation, the virtual MAC address is assigned through management console 399. Accordingly, one or more frames including a link layer (e.g., Ethernet header) is passed to virtual network interface 220. Encapsulation module 206 adds a virtual I/O header to the frame and invokes the I/O fabric interface to transmit the packet to the virtual I/O server 60. Accordingly, the message is further encapsulated with one or more I/O fabric headers for transmission from I/O fabric PHY interface 202 of application to the virtual I/O server 60. Multiplexer 308 receives the encapsulated Ethernet frame and forwards it to virtual network interface 346. The frame is eventually bridged onto the subnet through network PHY interface 340. Responsive messages received at network PHY interface 340 are forwarded back to application server 102 in a similar manner. Virtual I/O server 60 receives the packets reliably through I/O fabric PHY interface 302, which, in one implementation, is an Infiniband® interface. Encapsulation module 306 receives packets from PHY interface 302 and performs QoS/Traffic shaping and then delivers it to multiplexer 308.

As discussed above, in one implementation, the network interface and associated protocol drivers include bridging and spanning tree protocol functionality, treating virtual MAC addresses of the application servers in the same manner as regular MAC addresses. In one implementation, the network interfaces of virtual I/O server 60 run in promiscuous mode so that received packets are passed up the protocol stack for processing to determine whether they are destined for an application server 102. In one implementation, when a virtual MAC address is created, the management console 399 adds the virtual MAC address to the bridge layer 360. Bridge layer 360, in one implementation, operates similar to a switch which learns MAC addresses associated with the bridge ports by monitoring network traffic.

Network access by an application server 102 is similar to storage access by an application server 102, as described above. A physical NIC is assigned by the Virtual I/O Server to an application server 102. The NIC appears as a virtual NIC (VNIC) to the operating system running on that application server. Just as a physical NIC contains a MAC address, the VNIC contains an assigned virtual MAC address. This virtual MAC address is a unique identifier that allows the VNIC to provide all the functionality associated with a physical network device. The VNIC exposes itself as a fully functional layer 2 device to the operating system of the application server 102. In one implementation, all operating system level functionality is supported, including trunking and teaming. Still further, two or more NICs of virtual I/O server can be bonded using suitable link bonding protocols, such as Link Aggregation Control Protocol (LACP), etc. Furthermore, in most implementations, there is not a one-to-one mapping between virtual and physical NICs; rather, a single physical NIC can provide network connectivity to multiple virtual NICs for one to multiple application servers.

C. Bandwidth Management Over I/O Switch Fabric

The operation of the application servers 102 and the virtual I/O servers 60 generates packets or frames that are transmitted across the I/O switch fabric 50. As some of the Figures illustrate, a bandwidth management or QoS mechanism can be included in the application servers 102 and the virtual I/O servers 60 to control bandwidth utilization across the I/O switch fabric. For example, FIG. 8A illustrates an encapsulation and QoS layer 306 that can be utilized to enforce bandwidth allocations to different I/O traffic types. FIG. 8B illustrates a similar encapsulation and QoS layer 206 that controls bandwidth utilization at an application server 102. As FIGS. 3 and 5 illustrate, similar QoS functionality can be incorporated into encapsulation or other modules of the application servers 102 and the virtual I/O servers 60. Using these layers, I/O switch fabric bandwidth can be provisioned with policy-based assignments. In the implementation shown, the QoS layers or modules of the application servers 102 and the virtual I/O server 60 are operative to control the flow of outbound traffic onto the I/O switch fabric.

Figure 9A:
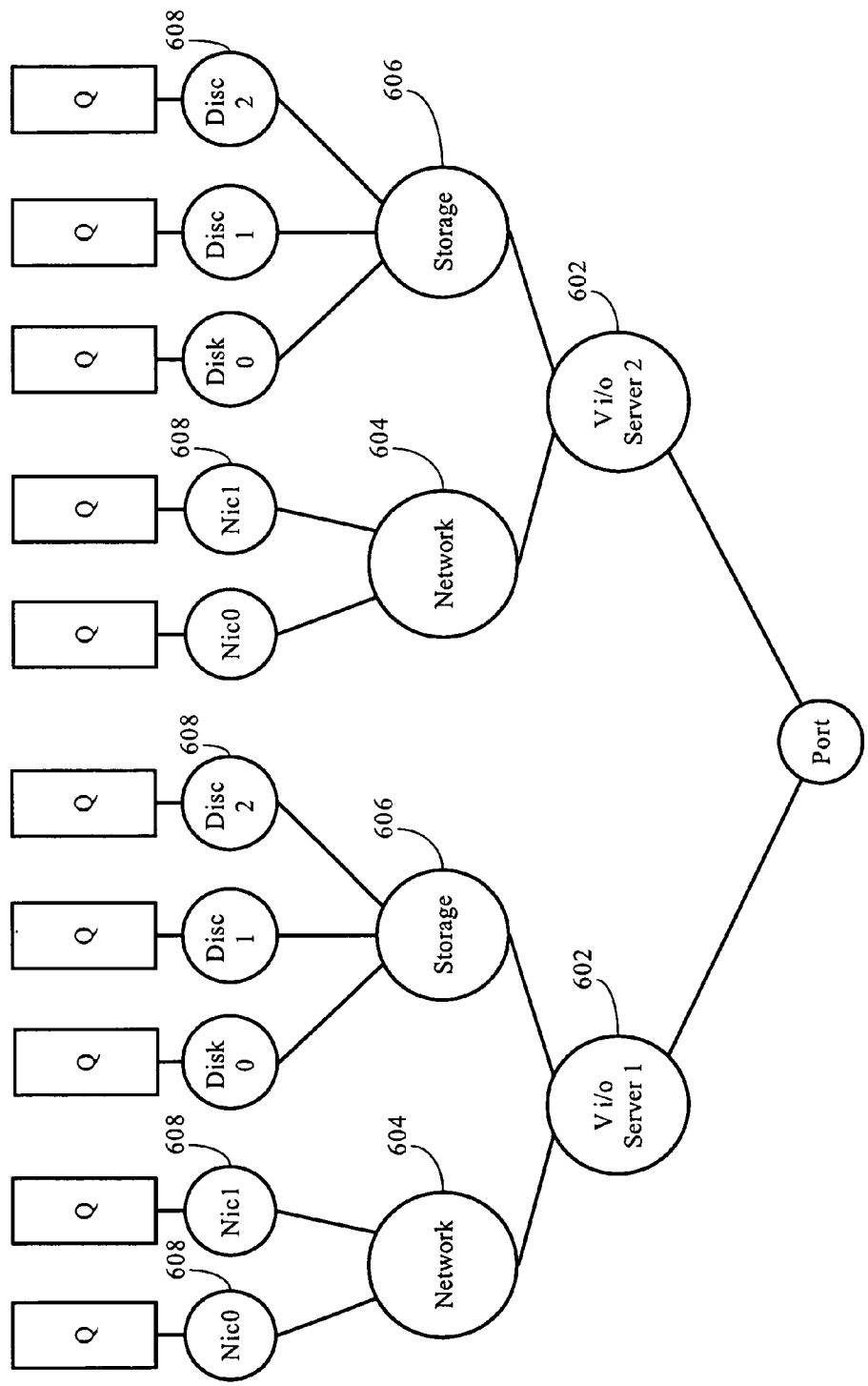
FIGS. 9A and 9B are diagrams illustrating example inverted HTB hierarchy configurations of an application server, which inverted hierarchy configurations might be used with some embodiments of the present invention.
Figure 9B:
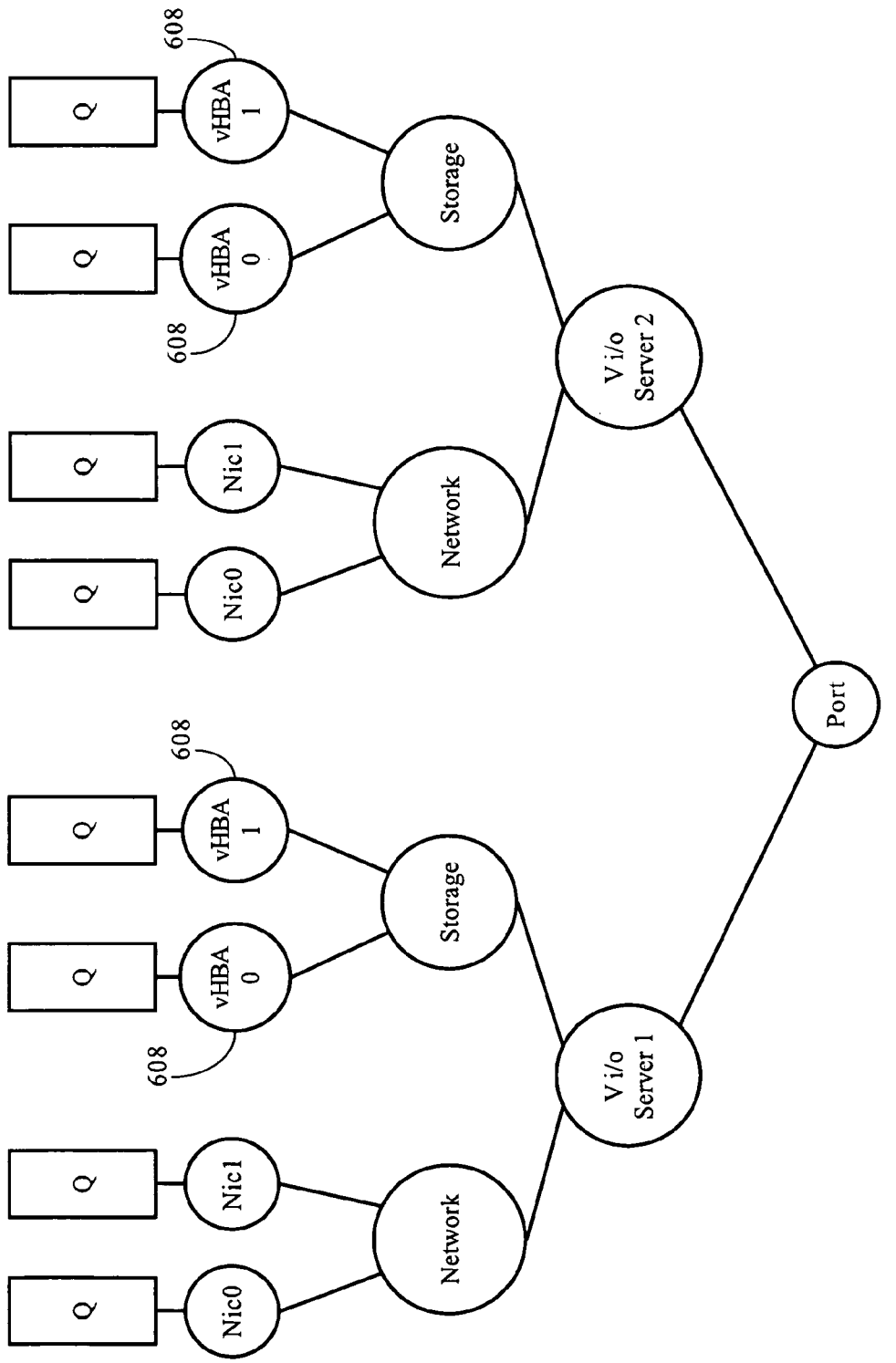

FIG. 9A is a diagram illustrating an inverted HTB hierarchy and its queues, which inverted hierarchy configuration could be implemented at one or more application servers 102. As shown in the diagram, the root of the inverted hierarchy represents a port, for example, a port connecting an application server 102 to a switched fabric such as InfiniBand. At the first level of the inverted hierarchy, are two nodes 602 representing virtual I/O servers 60a, 60b. As discussed above, each application server 102 may operate in connection with two or more virtual I/O servers 60 for load balancing or failover purposes. Network and storage nodes 604, 606, representing network and storage I/O subsystem traffic, respectively, are appended to nodes 602. Leaf nodes 608 represent the I/O subsystem traffic associated with each virtual interface, including storage and networking traffic. FIG. 9B illustrates an alternate hierarchical configuration where the child leaf nodes 608 of the storage node 606 represent virtual Host Bus Adapters (vHBAs). As shown in FIGS. 9A and 9B, packet queues are associated with leaf nodes, though tokens might be distributed throughout the inverted hierarchy, as will be explained further below. In addition, one or more of the application servers 102 may also include a second I/O fabric interface, in which case the hierarchical configuration illustrated in FIG. 9A, as well as the bandwidth control functionality described herein, can be replicated for this second interface.

Figure 10:
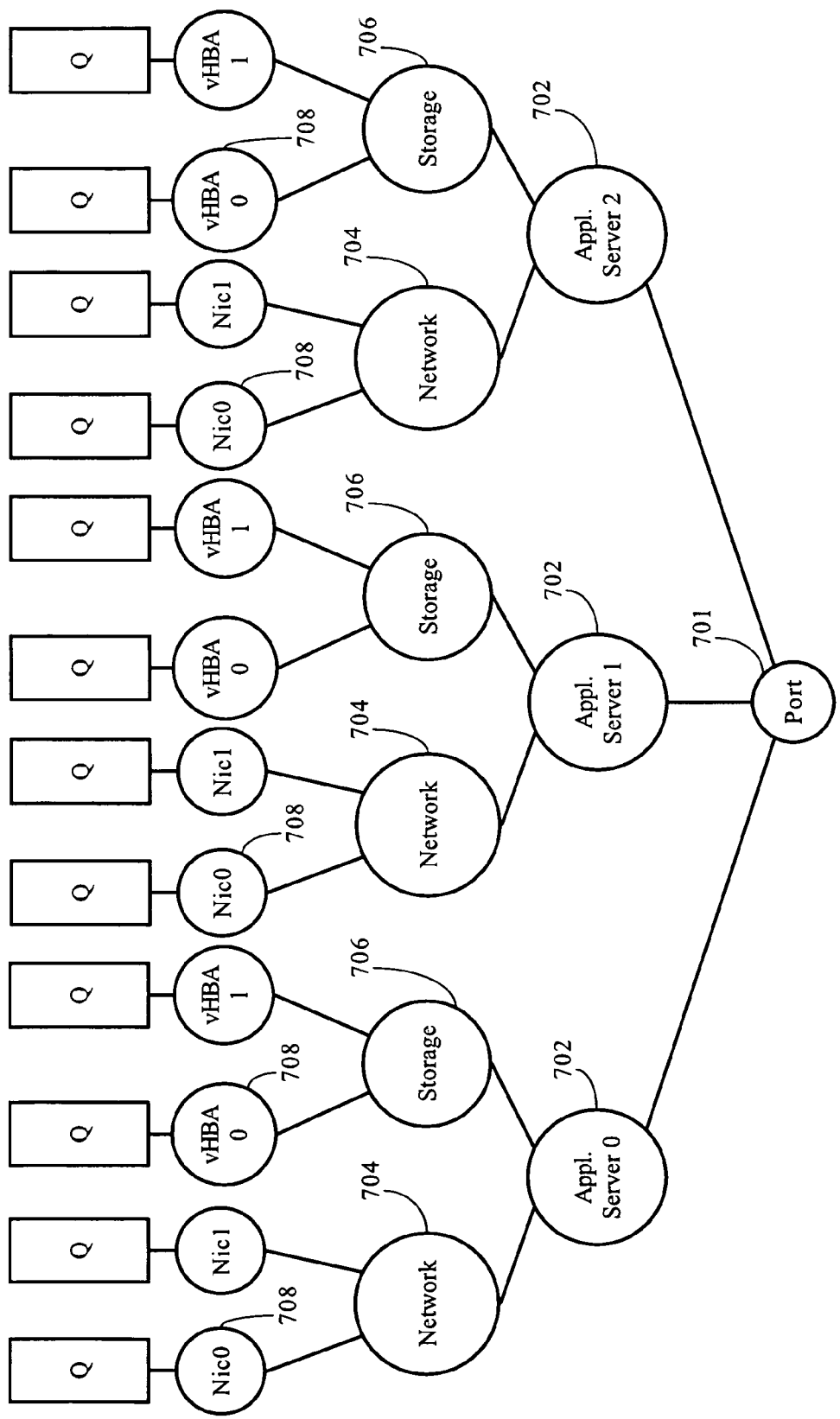
FIG. 10 is a diagram showing an example inverted HTB hierarchy configurations of virtual I/O server, which inverted hierarchy configurations might be used with some embodiments of the present invention.

FIG. 10 illustrates an inverted HTB hierarchy that may be configured and implemented on a virtual I/O server 60. As FIG. 10 illustrates, a root node 701 represents the I/O fabric interface. At a first level, the child nodes 702 of the root node 701 represent application servers 102. The remainder of the hierarchical configuration is similar to FIG. 9B in that networking and storage nodes 704, 706 are child nodes of each application server node 702. Further, leaf nodes 708 represent virtual devices or resources allocated to the respective application servers 102.

In some embodiments, the example hierarchies may be configured by a network administrator via a management console 399 shown in FIG. 3. For example, a network administrator may configure one or more virtual devices and/or interfaces for one to many application servers 102. The network administrator may then allocate bandwidth among the application servers, I/O traffic types and virtual devices/interfaces by configuring the nodes of the hierarchy with a bandwidth allocation. For example, the network administrator may divide the bandwidth available at a port of a virtual I/O server 60 between one or more application servers 102. The network administrator may make further allocations of a parent node allocation. To create an allocation, a network administrator may configure a minimum bandwidth guarantee for a node and/or a maximum bandwidth limit. Furthermore, hierarchical token bucket algorithms can be configured to allow unused bandwidth to be used or temporarily allocated to other nodes of the hierarchy as needed. In an example configuration, a network administrator may divide available bandwidth of a port 701 equally among the application servers 702. As to each share of bandwidth for a given application server 702, however, a network administrator may allocate a 60 percent share to network I/O traffic 704, and 40 percent to storage I/O traffic 706. The leaf nodes may be allocated an equal bandwidth share of their respective parent nodes. In addition, the network administrator may configure similar or complementary allocations at each application server 102.

Hierarchical token bucket can be considered as a class-based scheduling mechanism. HTB includes hierarchical classes where three class types exist: root, non-leaf and leaf. Root classes are at the top of the hierarchy, and all traffic essentially goes through them. Non-leaf classes have parent and child classes, while leaf classes have only parent classes. Incoming traffic is first classified to identify a leaf class. HTB uses the concept of tokens and buckets to schedule and shape traffic. Each class or node in the hierarchy has a bucket of tokens associated with it. HTB mechanisms allocate so-called tokens for the buckets at regular intervals. Scheduling a message or packet for transmission results in deducting an amount of tokens from a corresponding bucket, and is permitted when the corresponding bucket includes a sufficient number of tokens. In one implementation, each class has a guaranteed rate, a maximum rate, an actual or observed rate, and a priority level. High priority classes might borrow excess resource allocation (such as bandwidth) from low priority classes. For example, when the actual rate of a given class reaches its guaranteed rate, it may borrow tokens from its parent class. When a class reaches its maximum rate, packets may be queued until sufficient tokens are available.

Figure 11:
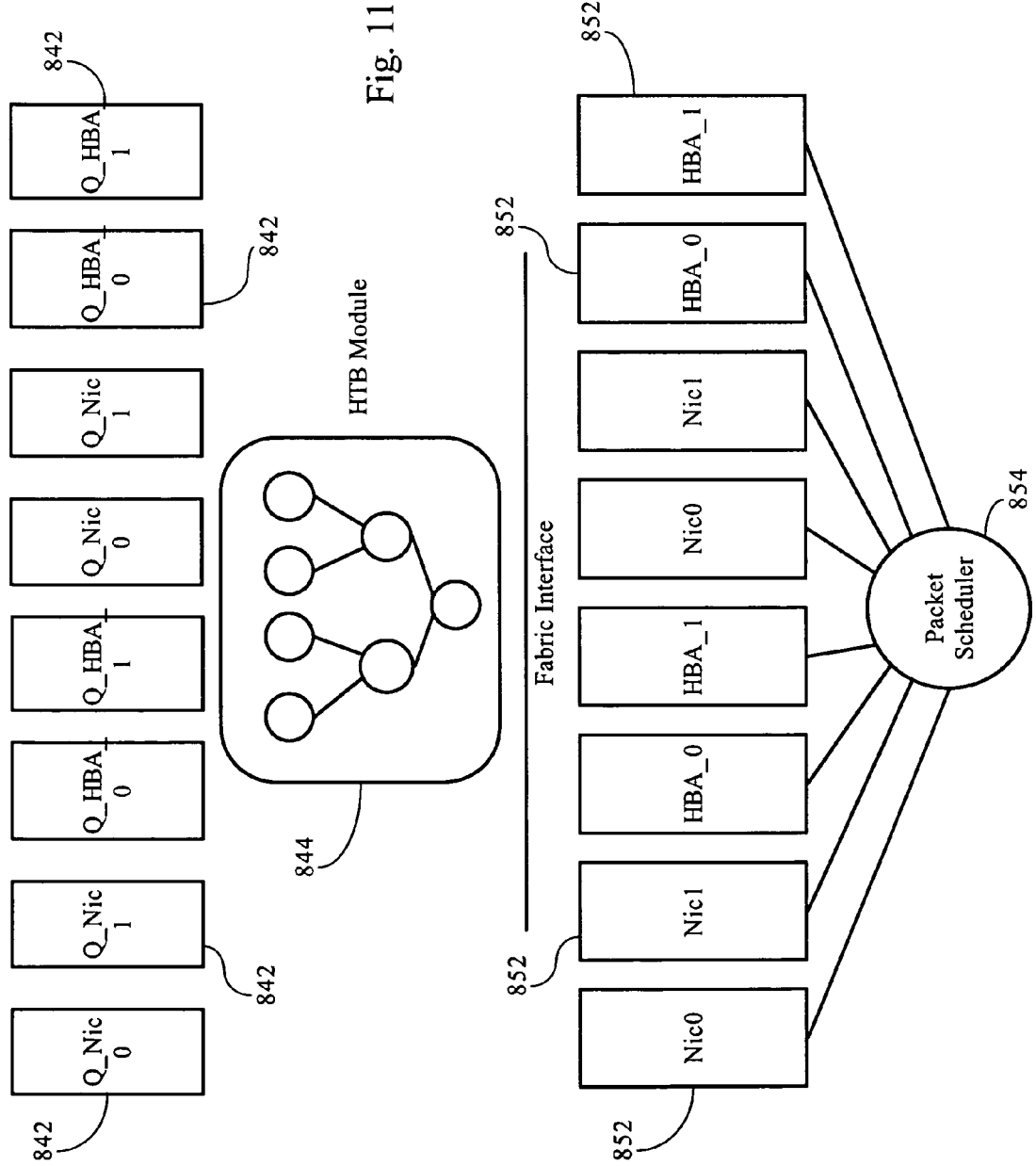
FIG. 11 is a schematic diagram illustrating queues, a synchronous HTB mechanism, and the queuing and scheduling mechanisms provided by a hardware fabric interface, according to some embodiments of the invention.

FIG. 11 illustrates some of the logical and hardware structures for implementing a bandwidth control mechanism for I/O traffic transmitted across the I/O switch fabric. Queues 842 are allocated to the leaf nodes of a configured HTB hierarchy. For example, queues 842 of FIG. 11 correspond to the leaf nodes 608 illustrated in FIG. 9B. Queues 852, on the other hand, represent the transmit queues implemented in the hardware of the I/O fabric interface. In a particular implementation, when a hierarchical configuration is created on an application server 102 or a virtual I/O server, 60, processing logic creates or allocates hardware queues or rings on the I/O fabric interface. For didactic purposes, additional details associated with the use of Infiniband as the I/O fabric interface are described. The OpenFabrics Alliance has developed a standardized InfiniBand software distribution. The InfiniBand software distribution consists of both kernel-level and user-level components, which complement each other. In the software stack, the low-level InfiniBand kernel driver module is hardware specific and ported on top of the associated hardware. The rest of the architecture is hardware agnostic and is divided into kernel-space software and user-space software.

The physical interface for Infiniband may comprise Host Channel Adapter (HCA) hardware. One or more driver layers, such as a HCA driver, may be used to control the physical interface. As noted earlier, the encapsulation modules of the application server 102 and/or virtual I/O servers 60 might include an HTB implementation. Further, in some embodiments, the I/O fabric interface might include a packet scheduler 854 that employs two descriptor ring buffers for each virtual device interface, one descriptor ring buffer or queue 852 for transmitting packets and one descriptor ring buffer for receiving packets. These matched descriptor ring buffers are sometimes called "queue pairs". When used in association with reliable connections, the queue pairs are sometimes called Reliable Connection Queue Pairs (RCQP). When transmitting packets to a network port from the transmit queue 852 for various virtual device interfaces, a packet scheduler 854 might use a round-robin or strict priority algorithm to arbitrate among the transmit queues, allowing access to the port. In one implementation, fabric interface of an application server is configured to include a queue pair of transmit and receive queues for each virtual device interface, such as virtual network interfaces and virtual host bus adapters.

As discussed above, operation of the application servers 102 and virtual I/O servers 60 results in the transmission of frames or packets corresponding to one or more virtual interfaces and/or devices. An HTB layer or module implemented on the application servers 102 and virtual I/O servers 60 controls bandwidth utilization of the I/O fabric interfaces. In a particular implementation, the transmission of packets or messages involves a synchronous mechanism where the HTB module or layer 844 is accessed to determine whether a packet is to be enqueued on a transmit queue 842, or can be written on a transmit or port queue 852 of the I/O fabric interface. The process is synchronous in that a process, separate from the HTB module or layer 844, attempts to forward the packet by consulting the HTB module 844 for permission to send the packet, as opposed to merely handing the packet off to a scheduling process.

Figure 12:
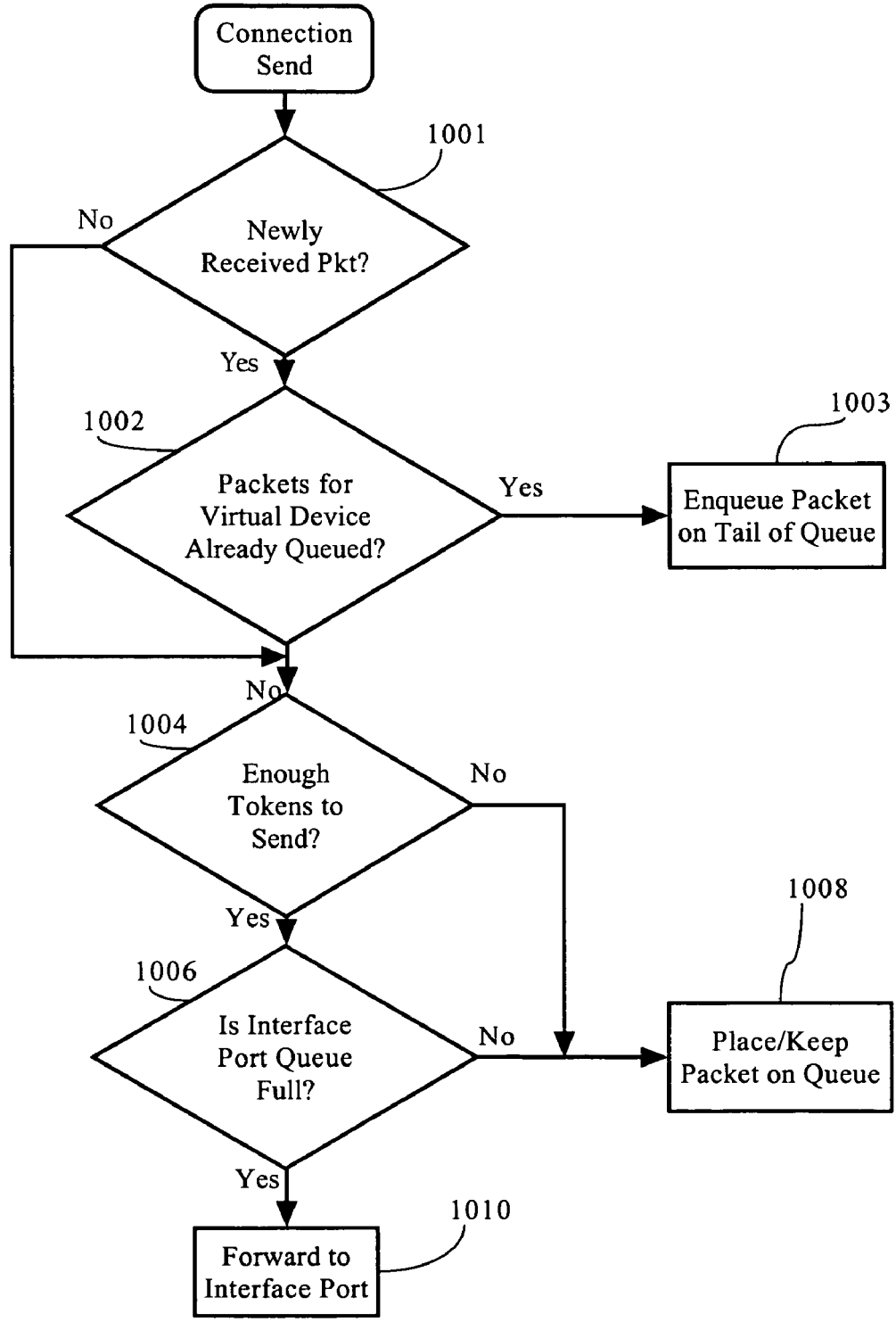
FIG. 12 is a flow chart illustrating an example process flow according to some embodiments of the invention.

FIG. 12 illustrates a connection send process according to one possible implementation of the invention. When a packet from a virtual device or interface is received at encapsulation module 206 of application server 102, for example, a connection send process is initiated. The connection send process may result in writing the packet to a virtual device queue or forwarding the packet to the output port of the I/O fabric interface. In a particular implementation, a hardware timer generates an interrupt that starts up the connection send process to process any enqueued packets. As discussed above, the connection send process is also responsive to newly received packets. In a particular implementation, the connection send process first determines whether the packet is a newly received packet or a packet stored on a processing queue 842 (1001). If the packet is a newly received packet, the connection send process determines whether prior packets are already stored on the virtual device queue 842 corresponding to the virtual device or interface (1002). If so, the connection send process enqueues the packet on the tail of the corresponding queue 842. If no, the connection send process accesses the HTB layer 844 to determine whether the packet can be sent (1004). In one implementation, the HTB layer 844 implements a hierarchical token bucket algorithm that controls when the connection send process can write packets onto the transmit queues 852 of the I/O fabric interface. In one implementation, when accessing the HTB layer 844, the connection send process passes an identifier of the virtual device or interface queue and a size of the packet. The HTB layer 844 can determine based on the state of one or more data structures and the size of the packet whether the packet can be sent, or whether the packet should be queued. If the packet cannot be sent, the connection send process enqueues the packet on the corresponding virtual device/interface queue 842 (1008). In one implementation, if the packet is a newly received packet, the connection send process writes the packet on to the tail of a virtual device queue 842. If the packet is a packet that has already been queued, the connection send process keeps the packet on the virtual device queue 842 or head inserts the packet onto the virtual device queue 842. If there are enough tokens to transmit the packet, the connection send process then accesses the I/O fabric interface to determine whether the hardware transmit queue or ring can receive the packet (e.g., whether the transmit queue or ring is full) (1006). If the corresponding transmit queue or ring 852 is full, the connection send process enqueues the packet on the corresponding virtual device/interface queue 842 (1008). If the virtual device/interface queue 842 can receive the packet, however, the connection send process passes a pointer to the packet to the transmit queue or ring 852. The HTB layer 844 in a separate process deducts tokens from one or more data structures corresponding to various nodes in response to writing the packet on a transmit queue 852. As discussed above, the packet scheduler 854 arbitrates among the transmit queues 852 to transmit packets across the I/O switch fabric 50.

Furthermore, a separate process or thread associated with each virtual device or interface queue 842 may execute to empty the queue, if it contains any packets. This process may operate by calling the connection send process described above. However, since the packet to be sent is not newly received (1001), it may omit the step 1002 where a determination is made whether a previous packet is already queued. In addition, step 1008 may be modified to keep the packet on the queue or head-insert the packet back into the queue, instead of writing the packet on the transmit queue 852. Furthermore, in one implementation, the HTB layer 844, if a packet cannot be sent, may return a timer value after which the de-queuing process should attempt to send queued packets. Accordingly, this de-queueing process or thread may be initiated by a timer where the delay value is based on a wait time suggested by the HTB layer 844.

For didactic purposes, the tables provided in FIGS. 13A to 13D illustrate operation of the HTB layer 844 based on a configuration subset of the nodes described above. Assume that a network administrator has configured a minimum bandwidth rate as to the port for a first application server (CN1) of 10% and for a second application server (CN2) of 20%. The network administrator has configured a maximum bandwidth rate as to the port for both CN1 and CN2 of 50%. Further, the network administrator has configured a minimum bandwidth rate of 40% for the network (e.g., VNI) and a minimum bandwidth rate of 40% for storage (e.g., VBI) as to CN1. Also, the network administrator has configured a maximum bandwidth rate of 50% for the network and a maximum bandwidth rate of 50% for storage as to CN1. For CN2's bandwidth, the network administrator has established a minimum bandwidth rate of 30% for the network (e.g., VNI) and a minimum bandwidth rate of 70% for storage (e.g., VBI) and a maximum bandwidth rate of 50% for the network and a maximum bandwidth rate of 80% for storage. HTB module 844 periodically allocates 1000 tokens for every T100 time units.

The tables set forth in FIGS. 13B to 13D show the effects of the example HTB layer on packet transmission during the time period from T-2 to T27. The first entry in the table, T-2, merely recapitulates the hierarchy described above. The second entry in the table, T-1, shows an initial distribution of the tokens through the first level of the hierarchy, so that CN1 receives 100 (10% of 1000) tokens and CN2 receives 200 (20% of 1000) tokens. The third entry in the table, T0, shows the initial distribution of the tokens through to the leaf level of the hierarchy, so that: (a) CN1's VNI receives 40 (40% of 100) tokens and CN1's VBI receives 40 (40% of 100) tokens; and (b) CN2's VNI receives 60 (30% of 200) tokens and CN2's VBI receives 140 (70% of 200) tokens.

The next entry in the table, T1, shows the arrival of a packet of 5 units (where the units, such as kilobytes, are configurable by the network administrator) at the port, destined for CN2's VNI, and the consumption of 5 tokens upon transmission of the packet. This consumption is shown in a reduction of CN2's VNI token count from 60 to 55. The entries in the table for T2 through T12 show similar packet arrivals and token consumptions. The token consumption per packet can be linear, as in this example (1 token consumed per unit size of the packet), or can be exponential. During this time (e.g. T0 to T12), the HTB is in a "green" phase, which means that the current rate of token consumption is below a minimum rate, which is 30% for CN2's VNI as shown in the summaries that precede the table and FIG. 7. However, at T12, CN2's VNI token count is zero so CN2's VNI borrows one quantum of tokens per transaction, which is 10 tokens as shown at T13 in a reduction of the token count for the hierarchy's root (Port) from 700 to 690 and an increase in CN2's VNI token count to 10. This borrowing enables the transmission of a 5-unit packet at T14 and a 5-unit packet at T15. Then similar borrowings take place at T16, T19, and T22. During the time that the borrowing occurs (e.g., T13 to T25), the HTB is in a "yellow" phase, which means that the current rate of token consumption is greater than a minimum rate but less than or equal to a maximum rate, which maximum rate is 50% for CN2's VNI as shown in the summaries that precede the table and FIG. 7. However, at T26, CN2's VNI has used 100 tokens or 50% of the 200 tokens initially distributed to CN2. Since the maximum rate for CN2's VNI is 50%, the HTB enters a "red" phase (e.g., T26 to T27), which means that any further transmissions would cause the maximum rate to be exceeded. Consequently, when another packet arrives at T26, it cannot be transmitted to CN2's VNI; a similar result occurs at T27.

Particular embodiments of the above-described processes might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many other possible orderings of the steps in the processes described above and many other possible modularizations of those orderings. As a result, the invention is not limited to the specific examples and illustrations discussed above, but only by the following claims and their equivalents.

What is claimed is:

1. An apparatus, comprising
a memory operative to maintain a plurality of queues, each queue corresponding to a virtual input/output (I/O) subsystem interface;
one or more processors;
an I/O fabric interface comprising a plurality of transmit buffers operative to store packets for transmission, and a packet scheduler operative to arbitrate among the plurality of transmit buffers to select packets for transmission;
a plurality of virtual I/O subsystem interface modules operative to:
establish a connection to a virtual I/O server;
emulate an I/O subsystem interface to an operating system; and
intercept packets passed to the I/O subsystem interface for forwarding to the virtual I/O server;
a Quality of Service (QoS) module operative to maintain a bandwidth allocation configuration model defining allocation of bandwidth of the I/O fabric interface among respective I/O subsystems emulated by the plurality of virtual I/O subsystem interface modules, and control, based on the bandwidth allocation configuration model, the forwarding of packets corresponding to the virtual I/O subsystem interfaces; and
a connection send module operative to:
access the QoS module to conditionally forward intercepted packets to a select transmit buffer of the I/O fabric interface for transmission over the connection to the virtual I/O server, or queue the intercepted packets in a queue of the plurality of queues corresponding to respective virtual I/O subsystem interfaces;
wherein the QoS module comprises a hierarchical token bucket mechanism configured with a hierarchical bandwidth allocation configuration model defining allocation of bandwidth of the I/O fabric interface among respective I/O subsystems emulated by the plurality of virtual I/O subsystem interface modules, and wherein operation of the hierarchical token bucket algorithm is operative to control the forwarding of packets.

2. The apparatus of claim 1 wherein the packet scheduler is operative to remove packets from the transmit buffers according to a round robin arbitration scheme.

3. The apparatus of claim 1 wherein the I/O fabric interface comprises a transmit buffer for each virtual I/O subsystem interface of the plurality of virtual I/O subsystem interfaces.

4. The apparatus of claim 1 wherein the connection send module is further operative to access the I/O fabric interface to determine whether the select transmit buffer of the plurality of transmit buffers is full; and
queue, if the select transmit buffer is full, the intercepted packets in a queue of the plurality of queues corresponding to respective virtual I/O subsystem interfaces.

5. The apparatus of claim 1 wherein one or more of the virtual I/O subsystem interface modules is operative to emulate a network interface.

6. The apparatus of claim 1 wherein one or more of the virtual I/O subsystem interface modules is operative to emulate a storage system interface.

7. An apparatus, comprising
a memory operative to maintain a plurality of queues, each queue corresponding to a virtual input/output (I/O) subsystem interface of an application server;
one or more processors;
an I/O fabric interface comprising a plurality of transmit buffers operative to store packets for transmission to one or more application servers, and a packet scheduler operative to arbitrate among the plurality of transmit buffers to select packets for transmission;
one or more I/O subsystem interfaces operative each to transmit and receive data from one or more devices;
one or more virtual I/O subsystem interface modules operative to:
establish connection to virtual I/O subsystem interface modules of one or more application servers;
emulate the application servers relative to the devices operably connected to the one or more I/O subsystem interfaces;
transmit, over the I/O fabric interface, packets from the devices operably connected to the one or more I/O subsystem interfaces to corresponding virtual I/O subsystem interface modules of the one or more application servers;
a Quality of Service (QoS) module operative to maintain a bandwidth allocation configuration model defining allocation of bandwidth of the I/O fabric interface among respective virtual I/O subsystem interface modules of the one or more application servers, and control, based on the bandwidth allocation configuration model, the forwarding of packets corresponding to the virtual I/O subsystem interface modules; and
a connection send module operative to:
access the QoS module to conditionally forward packets to a select transmit buffer of the I/O fabric interface for transmission over the connection to a virtual I/O subsystem interface module, or queue the intercepted packets in a queue of the plurality of queues corresponding to respective virtual I/O subsystem interface modules;
wherein the QoS module comprises a hierarchical token bucket mechanism configured with a hierarchical bandwidth allocation configuration model defining allocation of bandwidth of the I/O fabric interface among respective application servers and virtual I/O subsystem interface modules, and wherein operation of the hierarchical token bucket algorithm is operative to control the forwarding of packets.

8. The apparatus of claim 7 wherein the packet scheduler is operative to remove packets from the transmit buffers according to a round robin arbitration scheme.

9. The apparatus of claim 7 wherein the I/O fabric interface comprises a transmit buffer for each virtual I/O subsystem interface module of the one or more application servers.

10. The apparatus of claim 7 wherein the hierarchical bandwidth configuration model comprises a root node representing the I/O fabric interface, one or more intermediate nodes representing corresponding application servers, and one or more leaf nodes representing corresponding virtual I/O subsystem interface modules.

11. The apparatus of claim 10 wherein the hierarchical bandwidth configuration model comprises an I/O subsystem type node as a parent node of one or more of the leaf nodes, wherein the I/O subsystem type is a type selected from a storage device type or a network device type.

12. The apparatus of claim 7 wherein the connection send module is further operative to access the I/O fabric interface to determine whether the select transmit buffer of the plurality of transmit buffers is full; and queue, if the select transmit buffer is full, the intercepted packets in a queue of the plurality of queues corresponding to respective virtual I/O subsystem interface modules.

13. The apparatus of claim 7 wherein one or more of the subsystem interface modules is a network interface.

14. The apparatus of claim 7 wherein one or more of the subsystem interface modules is a storage system interface.

15. A method, comprising maintaining a connection, over a network I/O fabric, to one or more virtual I/O subsystem interface modules of one or more application servers;

presenting, at one or more physical I/O subsystem interfaces, respective identifiers of the one or more application servers, the identifiers corresponding to the one or more virtual I/O subsystem interface modules of one or more application servers;

maintaining a bandwidth allocation mechanism comprising bandwidth allocation configuration model defining allocation of bandwidth of the I/O fabric interface among respective virtual I/O subsystem interface modules of the one or more application servers;

classifying packets received over the one or more physical I/O subsystem interfaces into one or more virtual I/O subsystem interface modules of one or more application servers; and accessing the bandwidth allocation mechanism to conditionally forward packets to the I/O fabric interface for transmission over the connection to the virtual I/O subsystem interface modules, or queue the intercepted packets in a queue of a plurality of queues corresponding to respective virtual I/O subsystem interface modules;

wherein the bandwidth allocation mechanism comprises a hierarchical token bucket mechanism configured with a hierarchical bandwidth allocation configuration model defining allocation of bandwidth of the I/O fabric interface among respective application servers and virtual I/O subsystem interface modules.

16. The apparatus of claim 15 wherein the hierarchical bandwidth configuration model comprises a root node representing the I/O fabric interface, one or more intermediate nodes representing corresponding application servers, and one or more leaf nodes representing corresponding virtual I/O subsystem interface modules.

17. The apparatus of claim 16 wherein the hierarchical bandwidth configuration model comprises a I/O subsystem type node as a parent node of one or more of the leaf nodes, wherein the I/O subsystem type is a type selected from a storage device type or a network device type.

* * * * *